United States Patent
Choi et al.

(10) Patent No.: US 12,482,381 B2
(45) Date of Patent: Nov. 25, 2025

(54) DISPLAY APPARATUS

(71) Applicant: SAMSUNG ELECTRONICS CO., LTD., Suwon-si (KR)

(72) Inventors: Hyunyong Choi, Suwon-si (KR); Jisu Kim, Suwon-si (KR); Hunsung Kim, Suwon-si (KR); Boum-Sik Kim, Suwon-si (KR); Seungjae Kim, Suwon-si (KR); Chul-Yong Cho, Suwon-si (KR); Tae-Hun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 18/643,016

(22) Filed: Apr. 23, 2024

(65) Prior Publication Data
US 2024/0274041 A1  Aug. 15, 2024

Related U.S. Application Data

(63) Continuation of application No. 18/202,417, filed on May 26, 2023, now Pat. No. 11,996,016, which is a (Continued)

(30) Foreign Application Priority Data

Jan. 6, 2020  (KR) .................. 10-2020-0001663

(51) Int. Cl.
G09F 9/30 (2006.01)
G06F 1/16 (2006.01)

(52) U.S. Cl.
CPC .......... G09F 9/301 (2013.01); G06F 1/1652 (2013.01); G06F 1/1658 (2013.01)

(58) Field of Classification Search
CPC combination set(s) only.
See application file for complete search history.

(56) References Cited

U.S. PATENT DOCUMENTS 5,020,090 A  5/1991  Morris
5,619,395 A  4/1997  McBride
(Continued)

FOREIGN PATENT DOCUMENTS

AU  2019100334  5/2019
CN  1605970 A  4/2005
(Continued)

OTHER PUBLICATIONS

International Search Report dated Jan. 8, 2021 from International Application No. PCT/KR2020/011592.
(Continued)

*Primary Examiner* — Lisa Lea-Edmonds
(74) *Attorney, Agent, or Firm* — STAAS & HALSEY LLP

(57) ABSTRACT

A display apparatus includes a display module, a support configured to rotate and support the display module, and a mounting device configured to mount a mobile device on the display module. The mobile device is configured to be paired with the display module. The mounting device includes a mounting portion including a mounting groove having a shape corresponding to a frame forming borders of the display module. The mounting portion is coupled to the frame when the frame is inserted into the mounting groove, and an accommodating portion is positioned below the mounting portion, and accommodates the mobile device such that the mobile device is mounted on the display module.

18 Claims, 18 Drawing Sheets

Related U.S. Application Data continuation of application No. 17/847,567, filed on Jun. 23, 2022, now Pat. No. 11,705,024, which is a continuation of application No. 16/990,480, filed on Aug. 11, 2020, now Pat. No. 11,403,973.

(56) References Cited

U.S. PATENT DOCUMENTS

| | | | |
|---|---|---|---|
| 5,995,622 A | 11/1999 | Roussy et al. | |
| 6,481,681 B1* | 11/2002 | Stunkel | G06F 1/1601 248/229.11 |
| 6,538,880 B1 | 3/2003 | Kamijo | |
| 6,999,792 B2 | 2/2006 | Warren | |
| 7,117,564 B2 | 10/2006 | Jeong | |
| 7,203,058 B2 | 4/2007 | Hong | |
| 7,266,391 B2 | 9/2007 | Warren | |
| 7,471,511 B2 | 12/2008 | Montag | |
| 7,477,919 B2* | 1/2009 | Warren | H04M 1/72409 343/702 |
| 7,533,862 B2 | 5/2009 | Wu | |
| 8,205,842 B2 | 6/2012 | Wang et al. | |
| 8,317,146 B2* | 11/2012 | Jung | G06F 1/1601 361/679.04 |
| 8,630,088 B2 | 1/2014 | Collopy | |
| 8,842,429 B2 | 9/2014 | Ahn | |
| 8,939,417 B1 | 1/2015 | Wengreen | |
| 9,229,491 B2 | 1/2016 | Kim | |
| 9,339,112 B2 | 5/2016 | Wengreen | |
| 9,441,782 B2* | 9/2016 | Funk | F16M 13/00 |
| 10,412,560 B2* | 9/2019 | Miele | G06F 1/1613 |
| 10,564,671 B1* | 2/2020 | Romo | G06F 1/1632 |
| 10,791,836 B2* | 10/2020 | Holt | G06F 1/1686 |
| 11,403,973 B2* | 8/2022 | Choi | G06F 1/1652 |
| 11,456,769 B1 | 9/2022 | Miller | |
| 11,552,668 B1 | 1/2023 | Miller | |
| 11,705,024 B2* | 7/2023 | Choi | F16M 11/18 361/679.01 |
| 11,796,124 B2* | 10/2023 | Kim | F16M 11/2014 |
| 11,996,016 B2* | 5/2024 | Choi | F16M 11/2021 |
| 12,085,221 B2* | 9/2024 | Kim | G06F 1/1605 |
| 2004/0240167 A1 | 12/2004 | Ledbetter | |
| 2008/0026794 A1 | 1/2008 | Warren | |
| 2008/0103637 A1* | 5/2008 | Bliven | F16B 2/20 701/1 |
| 2009/0021903 A1 | 1/2009 | Chen | |
| 2009/0090825 A1 | 4/2009 | Jung | |
| 2009/0109242 A1 | 4/2009 | Kuo et al. | |
| 2010/0304792 A1 | 12/2010 | Li | |
| 2011/0157801 A1 | 6/2011 | Satterfield | |
| 2012/0037771 A1 | 2/2012 | Kitchen | |
| 2013/0016483 A1 | 1/2013 | Chuang | |
| 2013/0092805 A1 | 4/2013 | Funk | |
| 2014/0061406 A1 | 3/2014 | Chevalier | |
| 2014/0162733 A1 | 6/2014 | Cole | |
| 2015/0016037 A1 | 1/2015 | Takemi | |
| 2015/0301559 A1 | 10/2015 | Wu | |
| 2016/0219329 A1 | 7/2016 | Jee et al. | |
| 2017/0152990 A1 | 6/2017 | Kielland | |
| 2017/0328517 A1* | 11/2017 | Wessels | F16M 11/10 |
| 2018/0066683 A1 | 3/2018 | Bury | |
| 2020/0053891 A1 | 2/2020 | Kim | |
| 2021/0207761 A1* | 7/2021 | Kim | F16M 11/128 |
| 2021/0209972 A1* | 7/2021 | Choi | F16M 11/18 |
| 2022/0043477 A1 | 2/2022 | Rizvi | |
| 2022/0319358 A1* | 10/2022 | Choi | F16M 11/105 |
| 2022/0407988 A1 | 12/2022 | Chou | |
| 2023/0306879 A1* | 9/2023 | Choi | G06F 1/1611 |
| 2024/0003484 A1* | 1/2024 | Kim | G06F 1/1605 |
| 2024/0274041 A1* | 8/2024 | Choi | G06F 1/1611 |

FOREIGN PATENT DOCUMENTS

| | | |
|---|---|---|
| CN | 1614974 A | 5/2005 |
| CN | 101749525 A | 6/2010 |
| CN | 206802653 | 12/2017 |
| KR | 10-1050264 | 7/2011 |
| KR | 10-1060912 | 8/2011 |
| KR | 10-1371249 | 3/2014 |
| KR | 10-2014-0112375 | 9/2014 |
| KR | 10-2016-0091058 | 8/2016 |
| KR | 10-1670352 | 10/2016 |
| KR | 10-2017-0004593 | 1/2017 |
| KR | 10-2019-0053712 | 5/2019 |
| KR | 10-2019-0065416 | 6/2019 |
| KR | 10-2019-0099549 | 8/2019 |

OTHER PUBLICATIONS

Extended European Search Report dated Dec. 4, 2020 from European Application No. 20183067.6.

U.S. Office Action dated Dec. 16, 2021 from U.S. Appl. No. 16/990,480.

U.S. Notice of Allowance dated Mar. 30, 2021 from U.S. Appl. No. 16/990,480.

European Office Action dated May 24, 2022 from European Application No. 20183067.6.

U.S. Corrected Notice of Allowability dated Apr. 13, 2022 from U.S. Appl. No. 16/990,480.

U.S. Corrected Notice of Allowability dated Jun. 9, 2022 from U.S. Appl. No. 16/990,480.

U.S. Notice of Allowance dated Dec. 16, 2022 from U.S. Appl. No. 17/847,567.

U.S. Notice of Allowance dated Mar. 1, 2023 from U.S. Appl. No. 17/847,567.

Office Action dated Nov. 15, 2023, in Korean Application No. 10-2020-0001663.

Office Action dated Dec. 28, 2023, in Chinese Application No. 202010617302.9.

Notice of Allowance dated Jan. 24, 2024 issued in U.S. Appl. No. 18/202,417.

Corrected Notice of Allowability dated Mar. 8, 2024 issued in U.S. Appl. No. 18/202,417.

U.S. Appl. No. 18/202,417, filed May 26, 2023, Hyunyong Choi, Samsung Electronics Co., Ltd.

U.S. Appl. No. 17/847,567, filed Jun. 23, 2022, Hyunyong Choi, Samsung Electronics Co., Ltd.

U.S. Appl. No. 16/990,480, filed Aug. 11, 2020, Hyunyong Choi, Samsung Electronics Co., Ltd.

Communication under Rule 71(3) EPC dated Feb. 4, 2025, in European Application No. 20 183 067.6.

* cited by examiner

DISPLAY APPARATUS

CROSS-REFERENCE TO RELATED APPLICATION

This application is a continuation application of U.S. application Ser. No. 18/202,417, filed on May 26, 2023, which is a continuation application of U.S. application Ser. No. 17/847,567, filed on Jun. 23, 2022, which is a continuation application of U.S. application Ser. No. 16/990,480, filed on Aug. 11, 2020, which is based on and claims priority under 35 U.S.C. § 119 to Korean Patent Application No. 10-2020-0001663, filed on Jan. 6, 2020, in the Korean Intellectual Property Office, the disclosures of each of which are incorporated by reference herein in their entirety.

BACKGROUND

1. Field

The disclosure relates to a display apparatus including a display module, a support device for rotating and supporting the display module, and a mounting device for mounting a mobile device on the display module.

2. Description of the Related Art

A display apparatus is a kind of output apparatus that visually displays images and data information, such as characters, figures, etc. The display apparatus includes a display module for displaying images and a support device supporting the display module. The support device supports the display module such that a front side of the display module on which images are displayed, faces viewers.

Recently, a user's need for a display apparatus including a camera to enable a user to photograph himself/herself to produce contents or to check his/her gestures in real time when practicing dancing or doing exercise is increasing.

However, when a camera is installed in a display apparatus, invasion of privacy and security issues may be caused, and due to an increase of cost for installation of the camera, the marketability of the display apparatus may deteriorate.

SUMMARY

Therefore, it is an aspect of the disclosure to provide a display apparatus including a display module, a support device for rotatably supporting the display module, and a mounting device for mounting a mobile device on the display module.

It is another aspect of the disclosure to provide a display apparatus capable of using a camera module of a mobile device to use a camera without including any camera module.

It is another aspect of the disclosure to provide a display apparatus capable of automatically pairing a mobile device with a display module when the mobile device is mounted on a mounting device.

Additional aspects of the disclosure will be set forth in part in the description which follows and, in part, will be understood from the description, or may be learned by practice of the disclosure.

In accordance with a concept of the disclosure, a display apparatus includes: a display module including a screen display area, and a frame forming borders of the screen display area; a support device rotatably supporting the display module, and including a motor configured to provide a driving force for rotating the display module; and a mounting device supporting a mobile device such that the mobile device is mounted on the display module, wherein the mounting device is mounted on the display module, and includes a mounting portion having a shape corresponding to the frame and insert-combined with the frame and an accommodating portion positioned below the mounting portion and accommodating the mobile device.

The display module may include a longer side and a shorter side. The longer side may be positioned in a vertical direction when the display module is at a first position, and the longer side may be positioned in a horizontal direction when the display module is at a second position.

When the display module is at the first position, the mounting device may be mounted at a top end of the display module.

The mounting device may support the mobile device such that a top end of the mobile device is positioned outside the display module.

The frame may include: a front portion, wherein one end of the front portion contacts the screen display area; a side portion connected to the other end of the front portion, inclined backward from the screen display area, and being larger than the front portion; and a rear portion extending from the side portion toward a rear surface of the display module.

The mounting portion may include: a first contact part contacting the front portion of the frame; a second contact part contacting the side portion of the frame; and a third contact part contacting the rear portion of the frame.

The accommodating portion may include: a first support part supporting one of a front portion and a rear portion of the mobile device; a second support part supporting a lower portion of the mobile device; and a third support part supporting the other one of the front portion and the rear portion of the mobile device, wherein the mobile device may be fixed by an elastic restoring force acting in a direction in which the third support part approaches the first support part.

The display module may further include a coupling portion, the coupling portion positioned on the rear surface of the display module, and the mounting device may further include a coupling protrusion extending from the third contact part to be coupled to the coupling portion.

The coupling protrusion may include a protrusion protruding in a direction crossing a direction in which the coupling protrusion extends.

The coupling portion may include a coupling groove into which the coupling protrusion is inserted, and a coupling hole into which the protrusion is inserted.

The accommodating portion may include: a first support part supporting one of a front portion and a rear portion of the mobile device; a second support part supporting a lower portion of the mobile device; and a third support part supporting the other one of the front portion and the rear portion of the mobile device, and rotatably coupled to the second support part.

The first support part may include an arm portion extending from the first support part to be perpendicular to the first support part, the arm portion including a plurality of adjusting grooves spaced from each other.

The third support part may include an adjusting protrusion protruding in a side direction from a side surface of the third support part, and configured to be inserted into one of the plurality of adjusting grooves.

The mounting device may include: a body including a through hole penetrating sides of the mounting device; a coupling protrusion protruding in a side direction from the body; and a pair of support portions coupled to each other inside the through hole, wherein a distance between the pair of support portions is adjustable.

The display module may include a coupling portion positioned on a rear surface of the display module, wherein the coupling protrusion may be inserted into an inside of the coupling portion.

The coupling protrusion may be inserted into the inside of the coupling portion when the body rotates, and the mounting device may be coupled to the display module when the coupling protrusion is inserted into the inside of the coupling portion.

The pair of support portions may include: a first support portion including an adjusting protrusion positioned inside the through hole; and a second support portion including a plurality of adjusting grooves into which the adjusting protrusion is inserted and which are spaced along a direction in which the through hole extends.

When the adjusting protrusion is inserted into one of the plurality of adjusting grooves, a distance between the first support portion and the second support portion may be fixed.

A pair of coupling portions and a pair of coupling protrusions may be provided.

In accordance with a concept of the disclosure, a display apparatus includes: a display module; a support device rotatably supporting the display module; and a mounting device configured to mount a mobile device configured to be paired with the display module on the display module, wherein the mounting device includes: a mounting portion including a mounting groove having a shape corresponding to a frame forming borders of the display module, the mounting portion coupled to the frame when the frame is inserted into the mounting groove; and an accommodating portion positioned below the mounting portion, and accommodating the mobile device such that the mobile device is fixed to the display module.

The accommodating portion may include: a first support part supporting one of a front portion and a rear surface of the mobile device; a second support part supporting a lower portion of the mobile device; and a third support part supporting the other one of the front portion and the rear portion of the mobile device, wherein the mobile device may be fixed by an elastic restoring force acting in a direction in which the third support part approaches the first support part.

The accommodating portion may include: a first support part supporting one of a front portion and a rear portion of the mobile device; a second support part supporting a lower portion of the mobile device; and a third support part supporting the other one of the front portion and the rear portion of the mobile device, and rotatably coupled to the second support part.

The first support part may include an arm portion extending from the first support part to be perpendicular to the first support part, the arm portion including a plurality of adjusting grooves spaced from each other.

The third support part may include an adjusting protrusion protruding in a side direction from a side surface of the third support part, and configured to be inserted into one of the plurality of adjusting grooves.

In accordance with a concept of the disclosure, a display apparatus includes: a display module; a support device rotatably supporting the display module; and a mounting device configured to mount a mobile device configured to be paired with the display module on the display module, wherein the mounting device includes: a body including a through hole penetrating sides of the mounting device; and a pair of support portions coupled to each other inside the through hole, wherein a distance between the pair of support portions is adjustable.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations illustrated in the embodiments and the drawings described in the present specification are only the preferred examples of the disclosure, and thus it is to be understood that various modified examples, which may replace the embodiments and the drawings described in the present specification, are possible when filing the present application.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

It will be understood that, although the terms "first", "second", etc., may be used herein to describe various components, these components should not be limited by these terms. The above terms are used only to distinguish one component from another. For example, a first component discussed below could be termed a second component, and similarly, a second component may be termed a first component without departing from the scope of right of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described with reference to the accompanying drawings.

Figure 1:
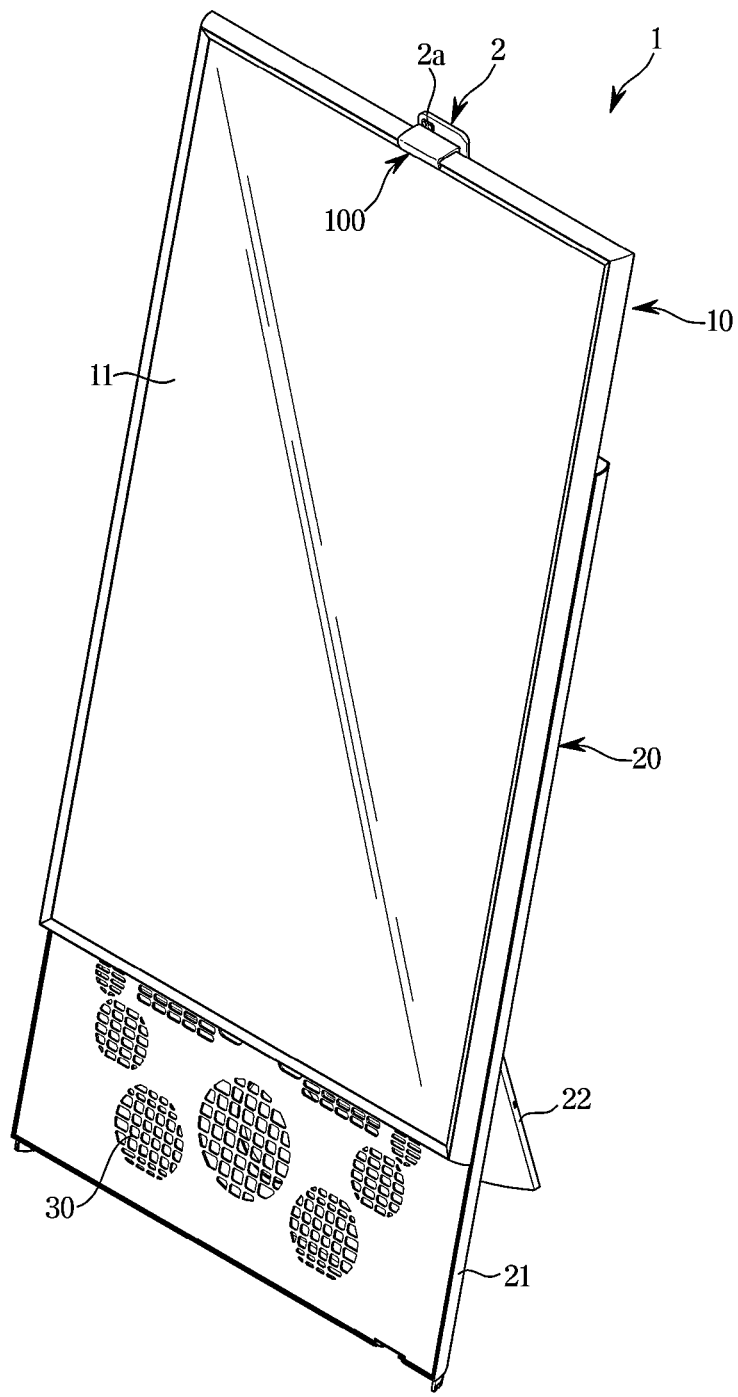
FIG. 1 is a perspective view of a display apparatus according to an embodiment of the disclosure when a mobile device is mounted on a mounting device.
Figure 2:
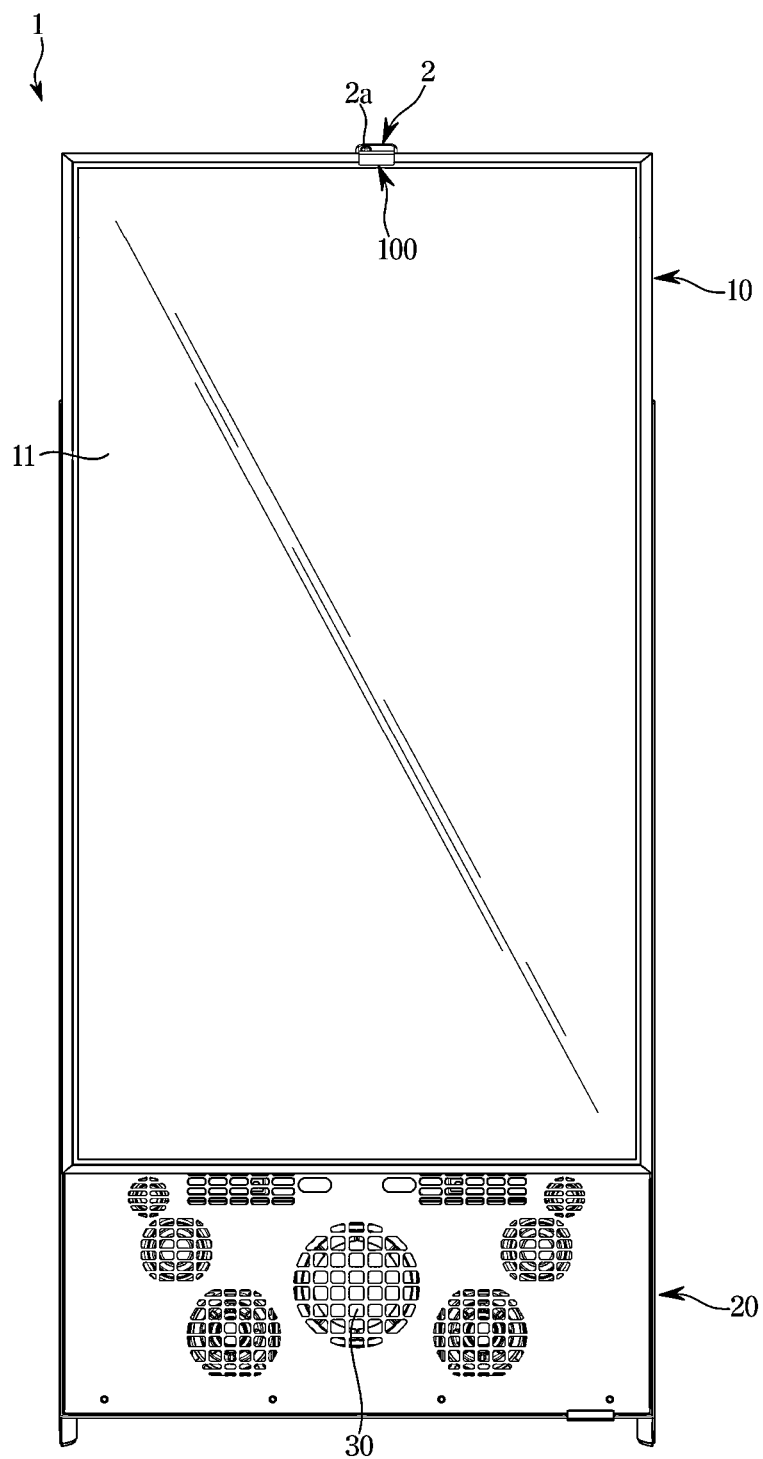
FIG. 2 is a front view of a display apparatus according to an embodiment of the disclosure when a display module is positioned vertically.
Figure 3:
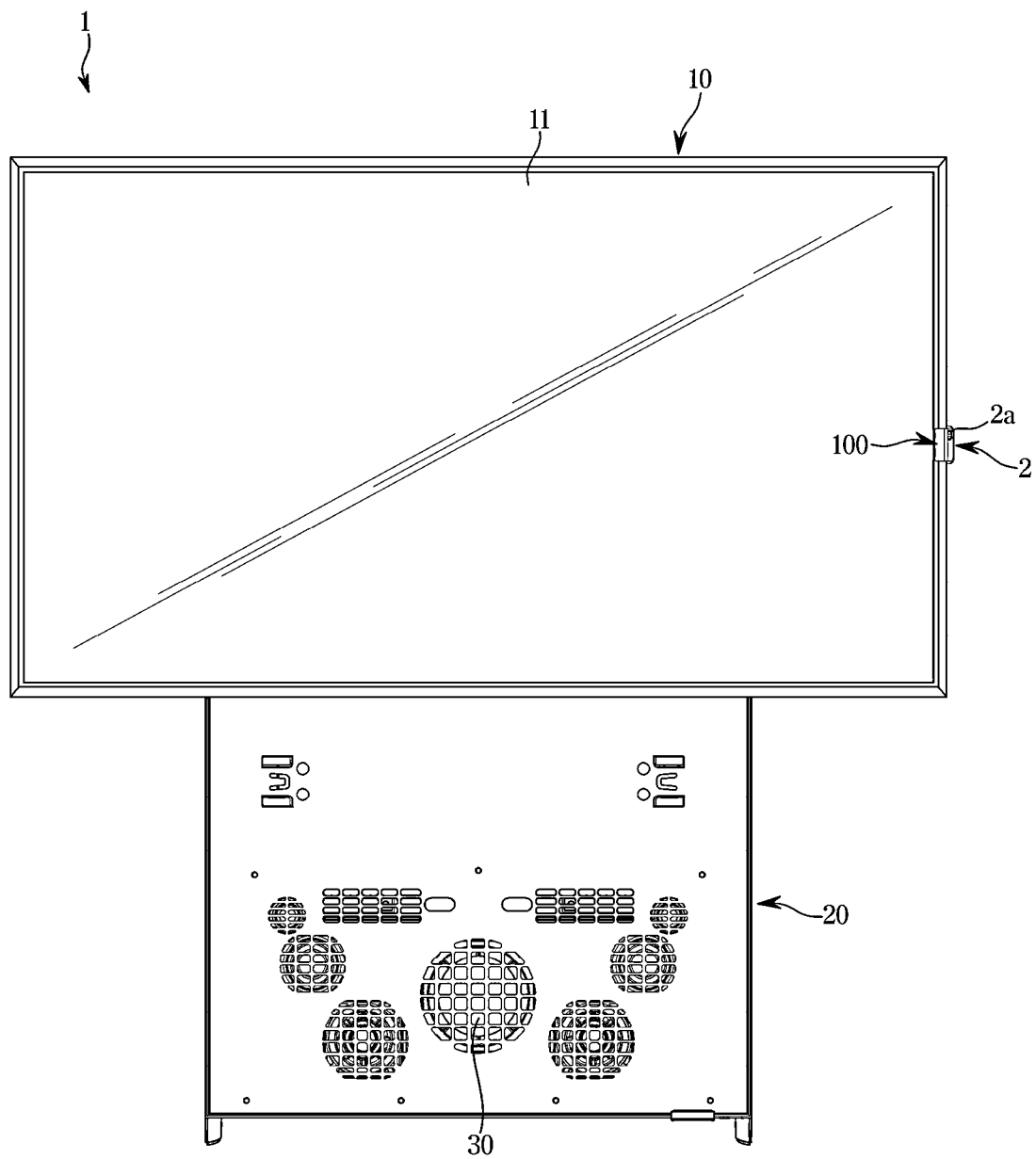
FIG. 3 is a front view of a display apparatus according to an embodiment of the disclosure when a display module is positioned horizontally.

FIG. 1 is a perspective view of a display apparatus according to an embodiment of the disclosure when a mobile device is mounted on a mounting device. FIG. 2 is a front view of a display apparatus according to an embodiment of the disclosure when a display module is positioned vertically. FIG. 3 is a front view of a display apparatus according to an embodiment of the disclosure when a display module is positioned horizontally.

Referring to FIG. 1, a display apparatus 1 may include a display module 10 for displaying a screen, a support device 20 coupled to a rear side of the display module 10 to support the display module 10, and a mounting device 100 coupled to the display module 10 to support a mobile device 2.

The display module 10 is a device for displaying information, data, etc. as characters, figures, graphs, and images, and examples of the display module 10 include a television, a monitor, etc.

The display module 10 may be configured to display a screen. The display module 10 may include a self-emissive display panel (not shown) such as organic light emitting diodes (OLEDs) or a non-emissive display panel (not shown) such as a liquid crystal display (LCD). However, a kind of a display panel included in the display module 10 is not limited.

A horizontal length of the display module 10 may be different from a vertical length of the display module 10. That is, the display module 10 may have a longer side and a shorter side. The display module 10 may be in a shape of a rectangular plate.

The support device 20 may be coupled to the rear side of the display module 10 to support the display module 10. The support device 20 may include a support body 21 to which the display module 10 is coupled, and a stand 22 coupled to a rear side of the support body 21. The support device 20 may stand when the support body 21 and the stand 22 are in contact with the ground.

The support device 20 may include a speaker 30 configured to generate sound. The speaker 30 may be positioned inside the support body 21. More specifically, the speaker 30 may be positioned in a lower portion of the support body 21 inside the support body 21. The speaker 30 may output sound to correspond to images displayed on the display module 10. However, the speaker 30 may output sound independently even when the display module 10 is in a power-off state. Also, the speaker 30 may be connected to an external device such as a mobile device 2 in a wired or wireless fashion to output sound reproduced by the external device.

The mounting device 100 may support the mobile device 2 to mount the mobile device 2 on the display module 10. The mounting device 100 may be coupled to the display module 10. The mounting device 100 may be removably coupled to the display module 10, although not limited thereto, which will be described later.

The mobile device 2 may be a kind of an external device, and may include, for example, a smart phone. Recently, with widespread dissemination of mobile devices, attempts for using mobile devices by various methods are being made. Representative examples of such attempts are mirroring of outputting sound output from a mobile device and images displayed on the mobile device through a display module, and casting of outputting content being outputting from a preset application of a mobile device through a display module. To use such mirroring or casting, the mobile device 2 may need to be paired with the display apparatus 1. According to a concept of the disclosure, the mobile device 2 may be paired with the display apparatus 1 through various methods, which will be described later.

Recently, many people photograph themselves through cameras to produce contents. Also, many people check their gestures by using cameras when practicing dancing or doing exercise. As such, a user's need for a mirror mode that uses screens of a camera and a display as mirrors, is increasing. However, to provide the mirror mode, a camera needs to be installed in a display apparatus, and when a camera is installed in a display apparatus, invasion of privacy and security issues may be caused. Also, due to an increase of cost for installation of the camera, the marketability of the display apparatus may deteriorate.

According to a concept of the disclosure, the display apparatus 1 may provide a mirror mode without installing a camera. To provide the mirror mode, the display apparatus 1 may include the mounting device 100. By mounting the mobile device 2 including a camera module 2a on the mounting device 100 and pairing the mobile device 2 with the display apparatus 1, a mirror mode may be provided. Because the mobile device 2 generally includes the camera module 2a, the display apparatus 1 may provide the mirror mode by using the camera module 2a of the mobile device 2. As such, by using the camera module 2a of the mobile device 2 which is an external device, a cost increase of the display apparatus 1, which may be caused by installation of a camera, may be prevented in advance. Also, by mounting the mobile device 2 on the mounting device 100 as necessary, invasion of privacy and security issues, which may be caused by the display apparatus 1, may be prevented in advance.

Referring to FIG. 2, the longer side of the display module 10 is positioned in a vertical direction and the shorter side of the display module 10 is positioned in a horizontal direction. Hereinafter, the position of the display module 10 is referred to as a vertical mode. Also, it may be expressed that the display module 10 is at a first position.

Referring to FIG. 3, the display module 10 may be positioned such that the longer side is in the horizontal direction and the shorter side is in the vertical direction. Hereinafter, the position of the display module 10 is referred to as a horizontal mode. Also, it may be expressed that the display module 10 is at a second position.

A user may position the display module 10 to the vertical mode or the horizontal mode selectively according to a screen ratio of images.

It is common for a display module to be fixed at a horizontal position. However, when a vertical image is displayed on the display module fixed at the horizontal position, no image is displayed on both side areas of the screen of the display module so that the screen fails to be efficiently used. To meet the latest trend of using both vertical images and horizontal images, a display apparatus capable of efficiently displaying various screen ratios is needed.

The display apparatus 1 according to a concept of the disclosure may position the display module 10 in the vertical mode when displaying a vertical image, and position the display module 10 in the horizontal mode when displaying a horizontal image, thereby efficiently using a screen display area 11. Accordingly, the display apparatus 1 according to a concept of the disclosure may efficiently display various screen ratios.

The display apparatus 1 according to a concept of the disclosure may include the display module 10, and the support device 20 that rotatably supports the display module 10 automatically by using a motor.

Referring to FIGS. 2 and 3, the display module 10 may be rotatable from the vertical mode to the horizontal mode or from the horizontal mode to the vertical mode. The support device 20 may rotate the display module 10 from the vertical mode to the horizontal mode or from the horizontal mode to the vertical mode.

The support device 20 may include a motor (not shown). The support device 20 may use a driving force of the motor to rotate the display module 10. Therefore, according to a concept of the disclosure, a user may drive the motor (not shown), instead of manually rotating the display module 10, to thereby automatically rotate the display module 10.

According to a concept of the disclosure, the mounting device 100 may support the mobile device 2 although the display module 10 is positioned in the horizontal mode. In other words, the mounting device 100 may support the mobile device 2 such that the mobile device 2 is not separated from the mounting device 100 even when the display module 10 is positioned in the horizontal mode. Accordingly, the mobile device 2 may be mounted on the display module 10 regardless of a position of the display module 10.

A user may selectively position the display module 10 to the horizontal mode or the vertical mode, and the display apparatus 1 may provide a mirror mode, mirroring, and casting in the horizontal mode or the vertical mode.

Meanwhile, as shown in FIGS. 1 to 3, the speaker 30 may be positioned below the display module 10. The speaker 30 may be positioned not to be covered by the display module 10 even when the display module 10 is positioned in the vertical mode. By the position of the speaker 30, the speaker 30 may stably output sound regardless of the position of the display module 10. Also, as shown in the drawings, the speaker 30 is shown from the outside of the support device 20, however, a metal cover including a plurality of holes or a fabric cover may be provided in front of the speaker 30.

Figure 4:
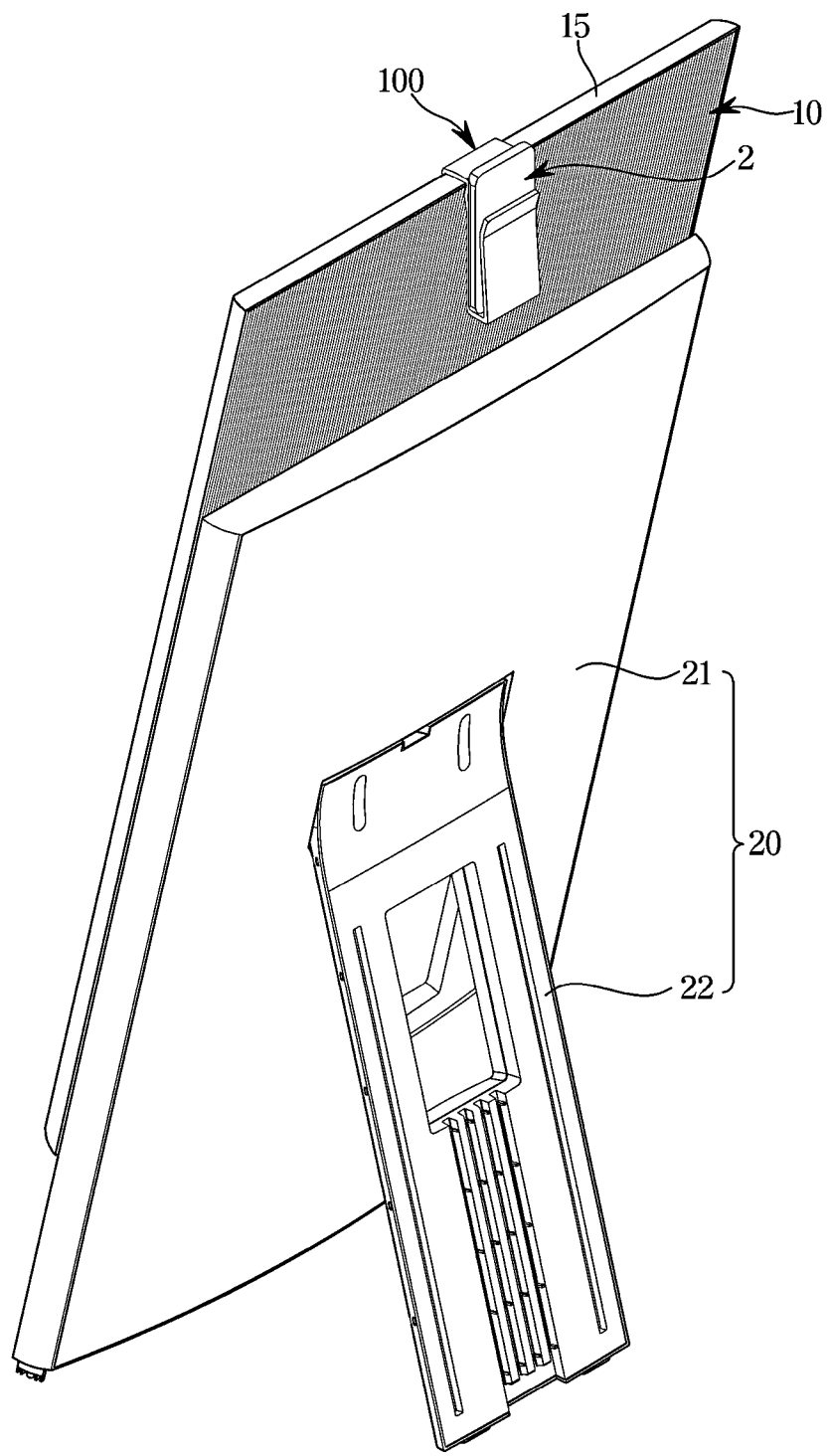
FIG. 4 is a rear perspective view of a display apparatus according to an embodiment of the disclosure.

FIG. 4 is a rear perspective view of the display apparatus according to an embodiment of the disclosure.

Referring to FIG. 4, the display apparatus 1 according to an embodiment of the disclosure may include the display module 10, the support device 20, and the mounting device 100.

The mounting device 100 may support the mobile device 2. The mounting device 100 may be positioned at a top end of the display module 10 when the display module 10 is positioned in the vertical mode. More specifically, the mounting device 100 may be positioned at a center of a top end of the display module 10 when the display module 10 is positioned in the vertical mode. The mounting device 100 may be removably coupled to the display module 10, which will be described later.

On the mounting device 100, the mobile device 2 may be mounted. The mounting device 100 may support the mobile device 2 such that the mobile device 2 rotates together with the display module 10. The mounting device 100 may support the mobile device 2 such that the mobile device 2 is mounted on the display module 10.

Figure 5:
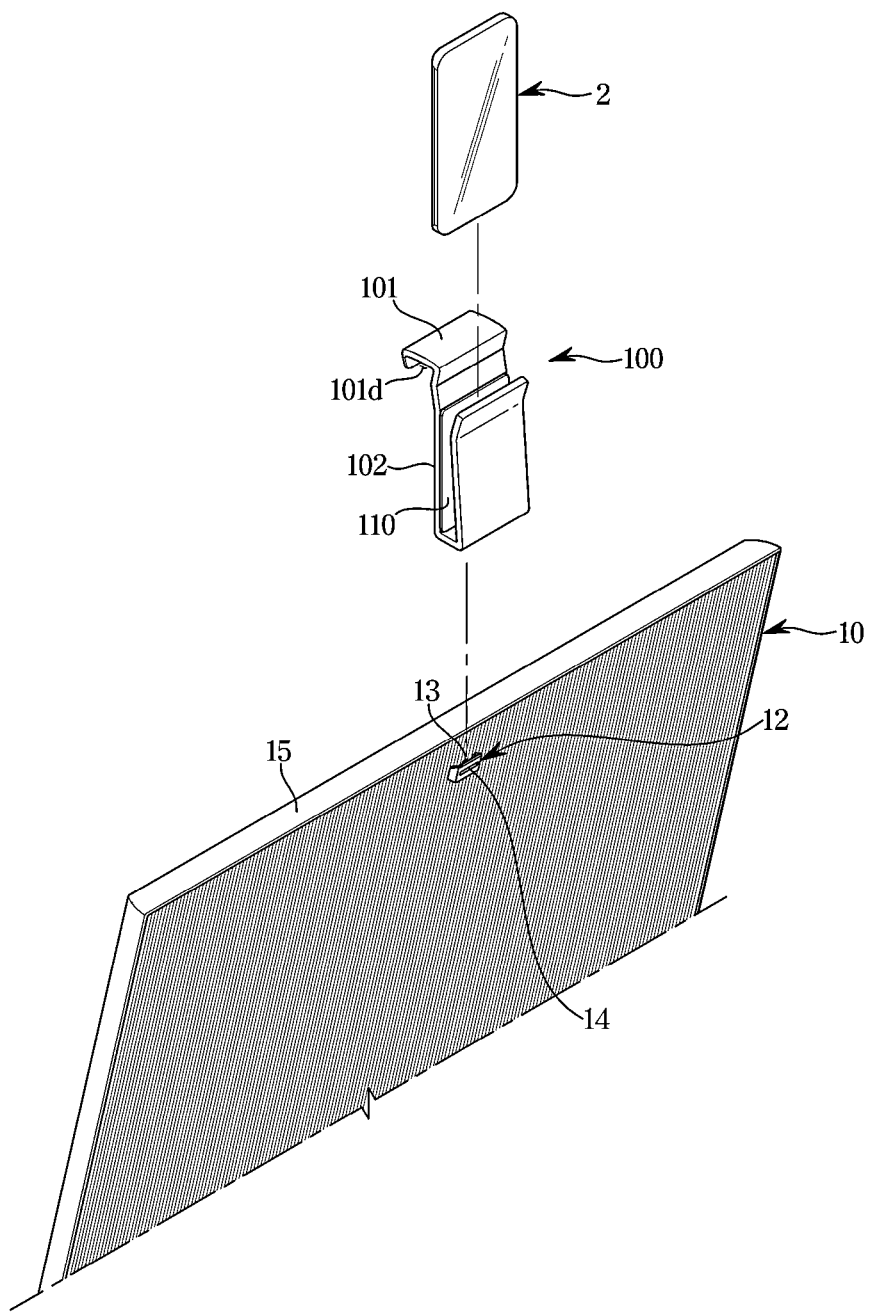
FIG. 5 is an exploded perspective view showing a display module, a mounting device, and a mobile device in the display apparatus shown in FIG. 4.

FIG. 5 is an exploded perspective view showing the display module 10, the mounting device 100, and the mobile device 2 in the display apparatus 1 shown in FIG. 4.

Referring to FIG. 5, the mobile device 100 according to an embodiment of the disclosure may be removably coupled to the display module 10. Also, the mobile device 2 may be mounted on or separated from the mounting device 100.

The mounting device 100 may be coupled to the display module 10 without using any coupling member, and separated from the display module 10 without using any member. Likewise, the mobile device 2 may be mounted on the mounting device 100 without using any member, and separated from the mounting device 100 without using any member.

On a rear surface of the display module 10, a coupling portion 12 may be provided such that the mounting device 100 is coupled to the display module 10. The coupling portion 12 may be positioned around a border of the rear surface of the display module 10 such that the camera module 2a of the mobile device 2 mounted on the mounting device 100 is positioned outside the display module 10. The coupling portion 12 may be positioned adjacent to the top end of the display module 10, so that the display module 10 is rotatable from the vertical mode to the horizontal mode or from the horizontal mode to the vertical mode even after the mounting device 100 is mounted on the display module 10. Also, the coupling portion 12 may be positioned adjacent to one side of the display module 10. In this case, the coupling portion 12 may be positioned adjacent to a top end of one side of the display module 10 such that the mounting device 100 is prevented from interfering with rotations of the display module 10. The top end and side of the display module 10 may be based on when the display module 10 is positioned in the vertical mode.

The coupling portion 12 may include a coupling groove 13 into which a coupling protrusion 104 (which will be described later) of the mounting device 100 is inserted, and a coupling hole 14 into which a protrusion 104a of the coupling protrusion 104 is inserted.

The coupling portion 12 may be in a shape of a box of which an upper portion opens. The coupling groove 13 may be a space formed between the rear surface of the display module 10 and the coupling portion 12. The coupling hole 14 may be formed in a part of the coupling portion 12, which faces the rear surface of the display module 10. According to an embodiment of the disclosure, a lower part of the coupling portion 12 may be closed. However, the lower part of the coupling portion 12 may be open.

According to an embodiment of the disclosure, the mounting device 100 may be coupled to the center of the top end of the display module 10 when the display module 10 is positioned in the vertical mode.

The mounting device 100 may include a mounting portion 101 having a shape corresponding to a frame 15 forming borders of the display module 10, and an accommodating portion 102 accommodating and supporting the mobile device 2.

Figure 7:
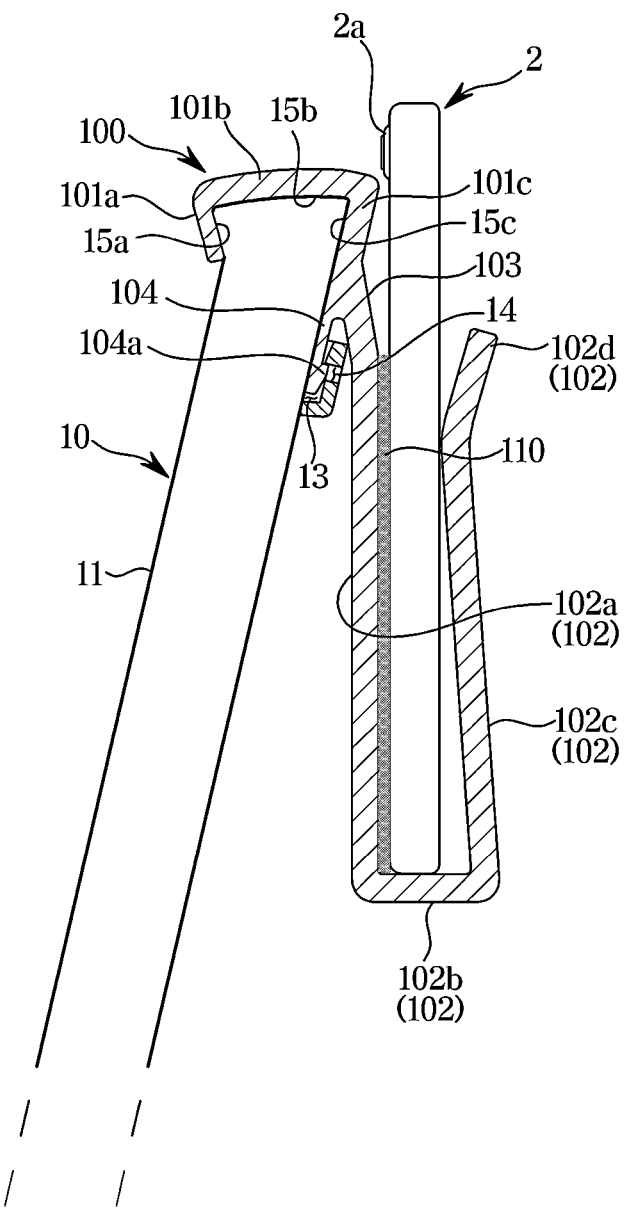
FIG. 7 shows a coupled structure of the display module, the mounting device, and the mobile device in the display apparatus shown in FIG. 4.

The frame 15 may include a front portion 15a, a side portion 15b, and a rear portion 15c (FIG. 7). According to an embodiment of the disclosure, the front portion 15a of the frame 15 may be in contact with the screen display area 11. The front portion 15a of the frame 15 may protrude frontward from the screen display area 11 and be inclined outward from the screen display area 11. The side portion 15b of the frame 15 may extend from the front portion 15a of the frame 15, and be inclined backward from the screen display area 11. The side portion 15b of the frame 15 may be larger than the front portion 15a of the frame 15. The rear portion 15c of the frame 15 may extend from the side portion 15b of the frame 15 toward the rear surface of the display module 10.

The mounting portion 101 may include a mounting groove 101d having a shape corresponding to the frame 15 of the display module 10. The mounting portion 101 may be made of a material having elasticity. The mounting portion 101 may be elastically deformed to be insert-combined with the frame 15 of the display module 10. In the present specification, the mounting portion 101 is also referred to as an elastic coupling portion.

The mounting portion 101 may include a first contact part 101a contacting a front border of the display module 10, a second contact part 101b contacting a top border of the display module 10, and a third contact part 101c contacting a rear border of the display module 10. The mounting groove 101d may be formed by the first contact part 101a, the second contact part 101b, and the third contact part 101c. The mounting groove 101d may have a shape corresponding to the frame 15, as described above (see FIG. 6).

The accommodating portion 102 may be positioned below the mounting portion 101. More specifically, the accommodating portion 102 may include a first support part 102a extending downward from the mounting portion 101, a second support part 102b extending from the first support part 102a to be perpendicular to the first support part 102a, and a third support part 102c extending from the second support part 102b to be inclined toward the first support part 102a. On the first support part 102a, a non-slip member 110 may be provided to prevent the mobile device 2 mounted on the mounting device 100 from slipping. The non-slip member 110 may be made of various materials. For example, the non-slip member 110 may be made of a rubber material having a high frictional force. The non-slip member 110 may be provided on the third support part 102c.

The first support part 102a may support one portion of the mobile device 2, the second support part 102b may support a lower portion of the mobile device 2, and the third support part 102b may support the other portion of the mobile device 2. The first support part 102a may be opposite to the rear surface of the display module 10.

The third support part 102c may extend from the second support part 102b to be inclined toward the first support part 102a. By the structure of the third support part 102c, a distance between the first support part 102a and an end of the third support part 102c may be smaller than a thickness of a general mobile device. The end of the third support part 102c may be one end of the third support part 102c, located close to the first support part 102a.

The first support part 102a, the second support part 102b, and the third support part 102c may have elasticity. When the first support part 102a, the second support part 102b, and the third support part 102c are elastically deformed, the distance between the first support part 102a and the end of the third support part 102c may change. A user may apply a force that is greater than an elastic force acting between the first to third support parts 102a, 102b, and 102c, thereby placing the mobile device 2 between the first support part 102a and the end of the third support part 102c. The mobile device 2 may be fixed at the mounting device 100 by the elastic force acting between the first support part 102a and the end of the third support part 102c.

When the mobile device 2 moves downward by the force of gravity, the second support part 102b may support the mobile device 2. Accordingly, the mobile device 2 may be stably supported by the mounting device 100.

The third support part 102c may further include a handle 102d extending from the end of the third support part 102c and inclined away from the first support part 102a. When a user separates the mobile device 2 mounted on the mounting device 100 from the mounting device 100, the user may put his/her finger in a space between the handle 102d and the mobile device 2 to pull the third support part 102c backward. Thereby, the user may easily separate the mobile device 2 mounted on the mounting device 100 from the mounting device 100.

Figure 6:
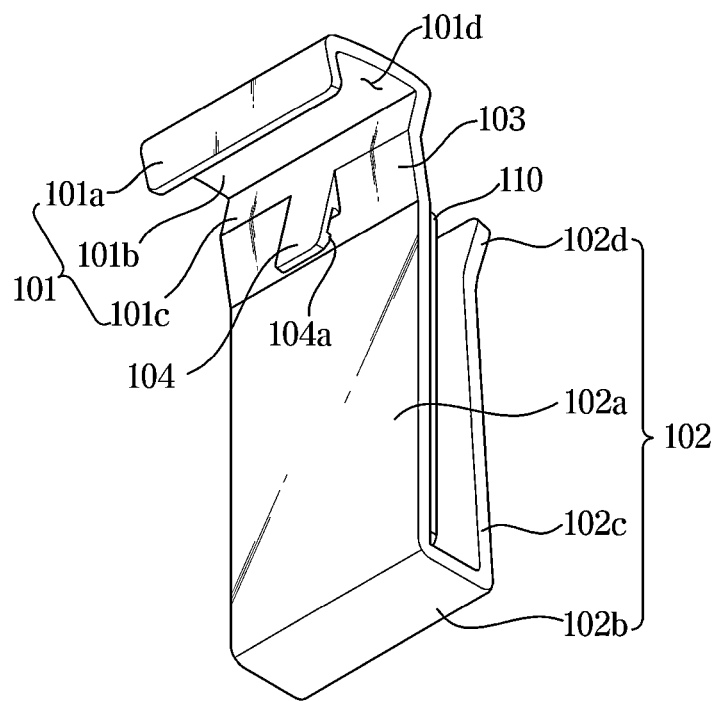
FIG. 6 shows the mounting device shown in FIG. 5 at another angle.

FIG. 6 shows the mounting device 100 shown in FIG. 5 at another angle. FIG. 7 shows a coupled structure of the display module 10, the mounting device 100, and the mobile device 2 in the display apparatus 1 shown in FIG. 4.

Referring to FIGS. 6 and 7, the mounting device 100 may further include the coupling protrusion 104 for more stable coupling to the display module 10.

The coupling protrusion 104 may extend from the third contact part 101c of the mounting portion 101. A connection part 103 may be provided between the third contact part 101c and the first support part 102a. The connection part 103 may extend from the third contact part 101c and be inclined toward the first support part 102a.

The coupling protrusion 104 and the third contact part 101c may be coplanar. The connection part 103 may be inclined from the third contact part 101c to prevent the coupling protrusion 104 from structurally interfering with the first support part 102a. In other words, the connection part 103 may form a space in which the coupling protrusion 104 is positioned between the third contact part 101c and the first support part 102a.

The coupling protrusion 104 may further include the protrusion 104a protruding toward the first support part 102a.

The coupling protrusion 104 may be coupled to the coupling portion 12 provided on the rear surface of the display module 10. The coupling protrusion 104 may be inserted into the coupling groove 13 of the coupling portion 12, and the protrusion 104a may be inserted into the coupling hole 14 of the coupling portion 12. When the coupling protrusion 104 is inserted into the coupling groove 13, the coupling protrusion 104 may be primarily coupled to the coupling portion 12. When the protrusion 104a is coupled to the coupling hole 14, the coupling protrusion 104 may be secondarily coupled to the coupling portion 12. The double coupling structure may reinforce a coupling force or a fixing force of the mounting device 100 with respect to the display module 10.

As described above, according to an embodiment of the disclosure, the mounting portion 101 of the mounting device 100 may be coupled to the border of the display module 10 by an elastic force. Also, the coupling protrusion 104 of the mounting device 100 may be coupled to the coupling portion 12 provided on the rear surface of the display module 10. The mounting device 100 may be stably coupled to the display module 10 by the mounting portion 101 and the coupling protrusion 104.

As described above, the mounting device 100 may be stably coupled to the display module 10 without using any coupling member. Also, the mounting device 100 may be separated from the display module 10 in the reverse order of a coupling order, and in this case, no coupling member may be needed.

The mobile device 2 may be supported and fixed to the mounting device 100 by the elastic force of the mounting device 100. More specifically, the mobile device 2 may be fixed in the accommodating portion 102 of the mounting device 100 by an elastic force between the first support part 102a and the second support part 102b and an elastic force between the second support part 102b and the third support part 102c.

To prevent the mobile device 2 from slipping inside the mounting device 100, the mounting device 100 may further include the non-slip member 110. The non-slip member 110 may be provided on the first support part 102a. However, the non-slip member 110 may be provided on the third support part 102c, and a location of the non-slip member 110 is not limited.

Figure 8:
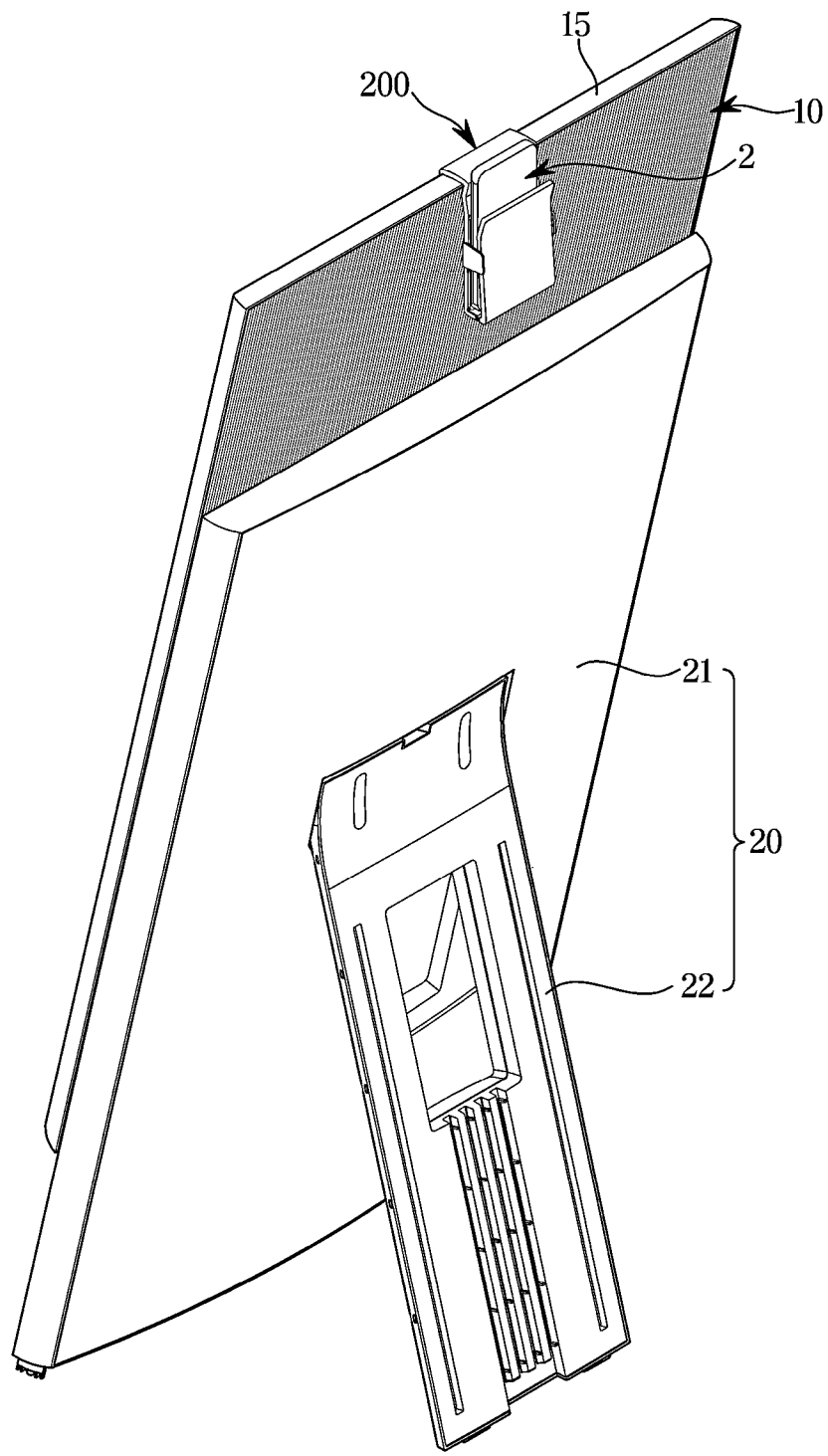
FIG. 8 is a rear perspective view of a display apparatus according to another embodiment of the disclosure.
Figure 9:
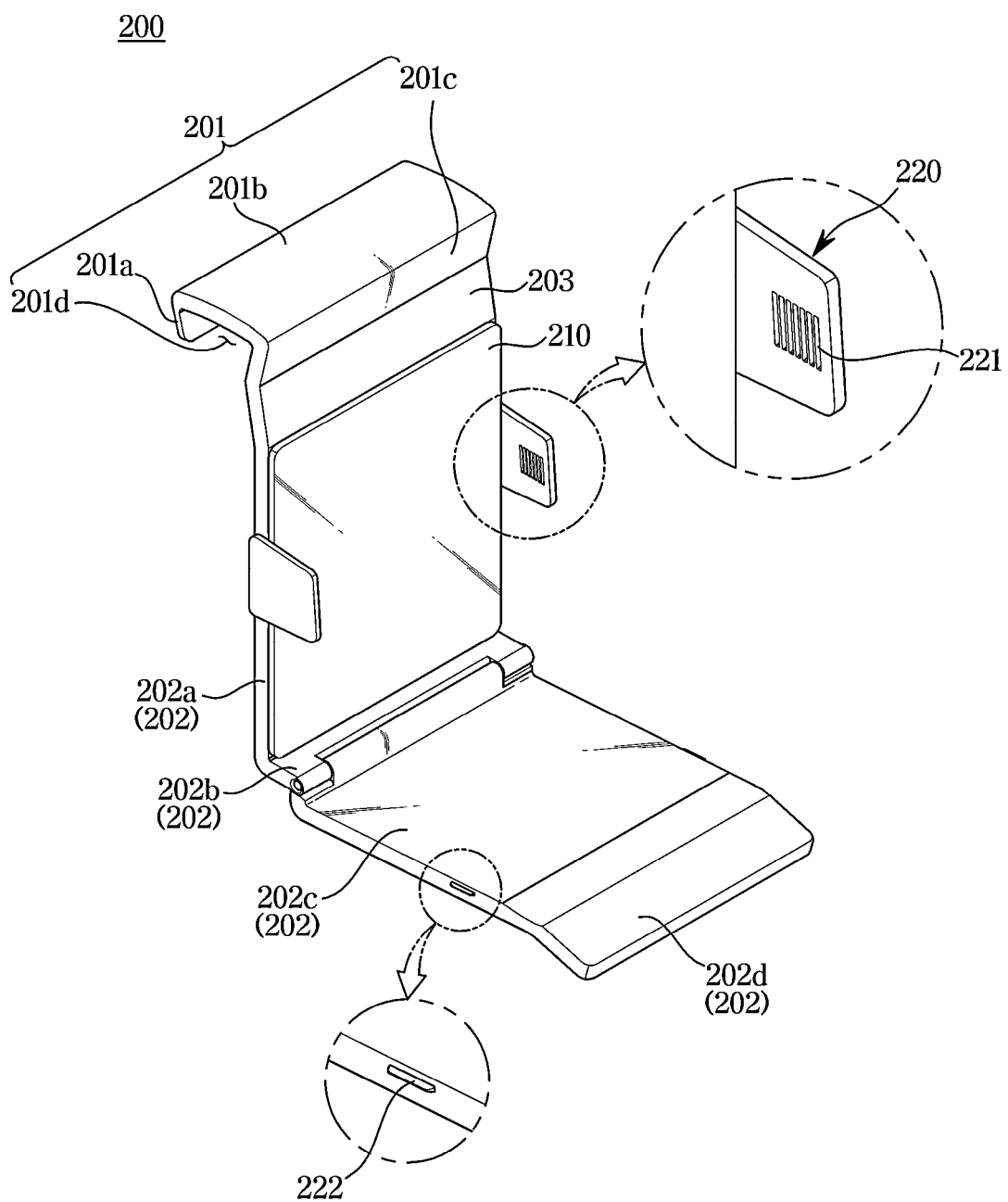
FIG. 9 shows a mounting device in the display apparatus shown in FIG. 8.
Figure 10:
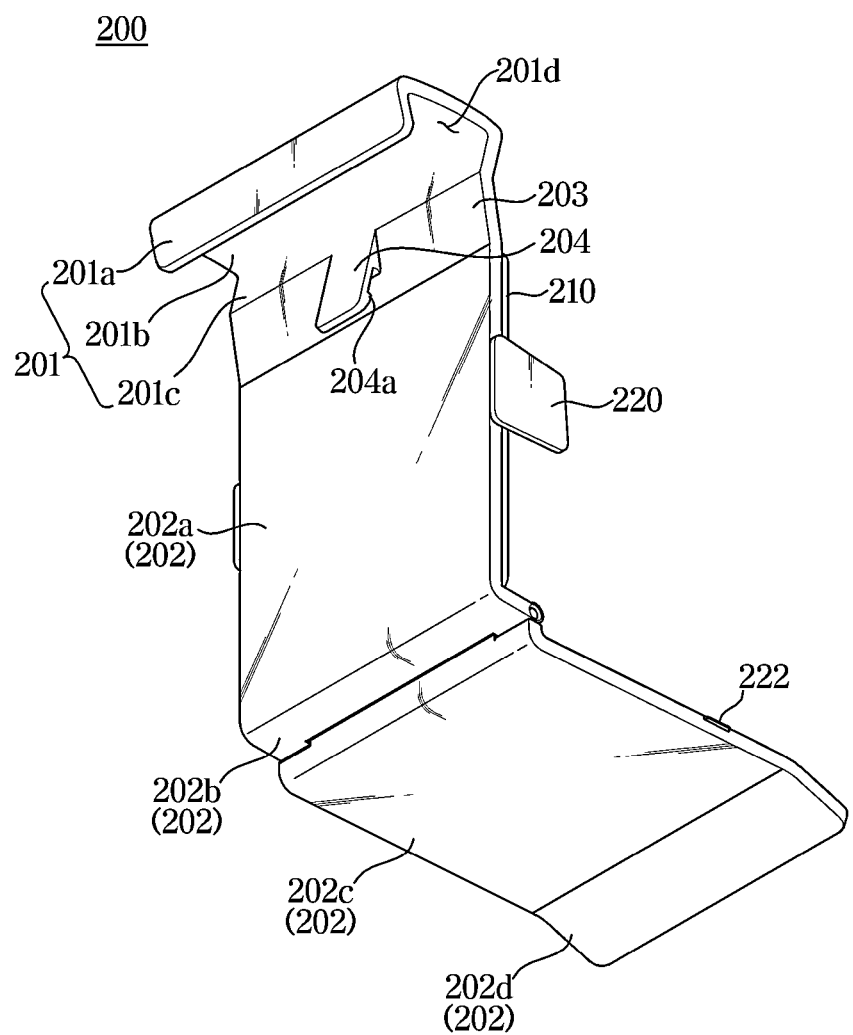
FIG. 10 shows the mounting device shown in FIG. 9 at another angle.
Figure 11:
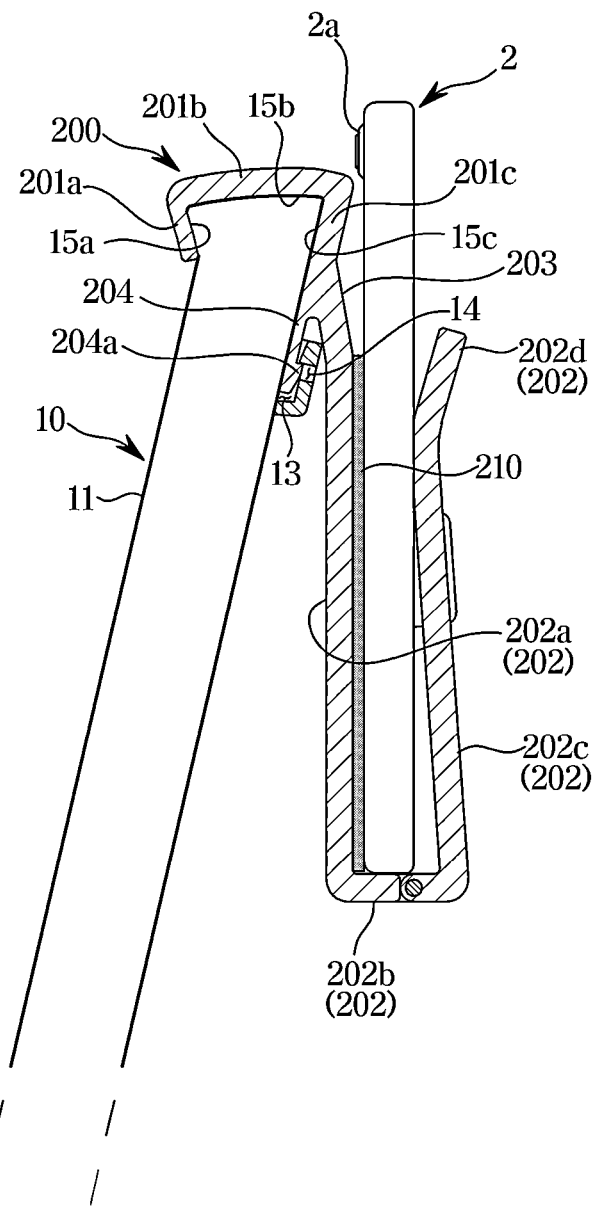
FIG. 11 shows a coupled structure of a display module, the mounting device, and a mobile device in the display apparatus shown in FIG. 8.

FIG. 8 is a rear perspective view of a display apparatus according to another embodiment of the disclosure. FIG. 9 shows a mounting device in the display apparatus shown in FIG. 8. FIG. 10 shows the mounting device shown in FIG. 9 at another angle. FIG. 11 shows a coupled structure of a display module, the mounting device, and a mobile device in the display apparatus shown in FIG. 8.

Referring to FIGS. 8 to 11, the display apparatus 1 according to another embodiment of the disclosure may include the display module 10, the support device 20, and a mounting device 200. Hereinafter, descriptions about the same components as those described above will be omitted.

The mounting device 200 according to another embodiment of the disclosure may be coupled to the display module 10 or separated from the display module 10, without using any member.

On the rear surface of the display module 10, the coupling portion 12 may be provided so that the mounting device 200 is coupled to the display module 10. The coupling portion 12 may include the coupling groove 13 into which the coupling protrusion 204 (which will be described later) of the mounting device 200 is inserted, and the coupling hole 14 into which the protrusion 204a of the coupling protrusion 204 is inserted.

The mounting device 200 may include a mounting portion 201 having a shape corresponding to the frame 15 forming the borders of the display module 10, and an accommodating portion 202 accommodating the mobile device 2 and supporting the mobile device 2.

The mounting portion 201 may include a first contact part 201a contacting a front border of the display module 10, a second contact part 201b contacting a top border of the display module 10, and a third contact part 201c contacting a rear border of the display module 10.

The mounting portion 201 may include a mounting groove 201d formed by the first contact part 201a, the second contact part 201b, and the third contact part 201c, and having a shape corresponding to the frame 15.

The mounting device 200 may further include a coupling protrusion 204. The coupling protrusion 204 may extend from the third contact part 201c of the mounting portion 201. A connection part 203 may be provided between the third contact part 201c and a first support part 202a. The connection part 203 may extend from the third contact part 201c and be inclined toward the first support part 202a.

The coupling protrusion 204 may further include a protrusion 204a protruding toward the first support part 202a.

The coupling protrusion 204 may be coupled to the coupling portion 12 provided on the rear surface of the display module 10. The coupling protrusion 204 may be inserted into the coupling groove 13 of the coupling portion 12, and the protrusion 204a may be inserted into the coupling hole 14 of the coupling portion 12. When the coupling protrusion 204 is inserted into the coupling groove 13, the coupling protrusion 204 may be primarily coupled to the coupling portion 12. When the protrusion 204a is inserted into the coupling hole 14, the coupling protrusion 204 may be secondarily coupled to the coupling portion 12. The double coupling structure may reinforce a coupling force or a fixing force of the mounting device 200 with respect to the display module 10.

According to another embodiment of the disclosure, the accommodating portion 202 may include the first support part 202a supporting one portion of the mobile device 2, a second support part 202b supporting a lower portion of the mobile device 2 and extending from the first support part 202a to be nearly perpendicular to the first support part 202a, and a third support part 202c supporting the other portion of the mobile device 2 and rotatably coupled to the first support part 202a.

The first support part 202a and the second support part 202b may be integrated into one body, and the third support part 202c may be provided separately from the first support part 202a and the second support part 202b. The third support part 202c may be hinge-coupled to the second support part 202b in such a way to be rotatable with respect to the second support part 202b.

The first support part 202a may include a non-slip member 210 for preventing the mobile device 2 from slipping. However, the third support part 202c may include the non-slip member 210.

The first support part 202a may include an arm portion 220 including a plurality of adjusting grooves 221. A pair of arm portions 220 may extend from both side ends of the first support part 202a to be nearly perpendicular to the first support part 202a. The pair of arm portions 220 may face each other. Each arm portion 220 may include a plurality of adjusting grooves 221, wherein the plurality of adjusting grooves 221 of the arm portion 220 may be opposite to a plurality of adjusting grooves 221 of the other arm portion 220. The arm portions 220 may limit a side movement range of the mobile device 2. The arm portions 220 may prevent the mobile device 2 from moving in side directions to be separated from the mounting device 200.

The third support part 202c may include an adjusting protrusion 222 formed in a side surface of the third support part 202c. The adjusting protrusion 222 may be formed in both side surfaces of the third support part 202c. A pair of adjusting protrusions 222 may be provided. The adjusting protrusion 222 may be inserted into the adjusting grooves 221. When the adjusting protrusion 222 is inserted into one of the adjusting grooves 221, a position of the third support part 202c with respect to the first support part 202a may be fixed. The adjusting protrusion 222 may be insert-combined with the adjusting groove 221 by elastic deformation.

A user may insert the adjusting protrusion 222 into an appropriate adjusting groove 221 by considering a thickness of the mobile device 2. Thereby, the mobile device 2 may be fixed between the first support part 202a and the third support part 202c.

The third support part 202c may further include a handle 202d extending from the third support part 202c and inclined from the third support part 202c. The user may put his/her finger into a space between the handle 202d and the mobile device 2 to rotate the third support part 202c with respect to the first support part 202a. Accordingly, the adjusting protrusion 222 may be taken out of the adjusting groove 221, and the third support part 202c may be decoupled from the first support part 202a. After the third support part 202c is decoupled from the first support part 202a, the user may separate the mobile device 2 from the mounting device 200.

Although not shown in the drawings, the arm portion 220 may include a plurality of adjusting protrusions, and the third support part 202c may include an adjusting groove which is formed in the side surface of the third support part 202c and into which one of the adjusting protrusions is inserted.

Figure 12:
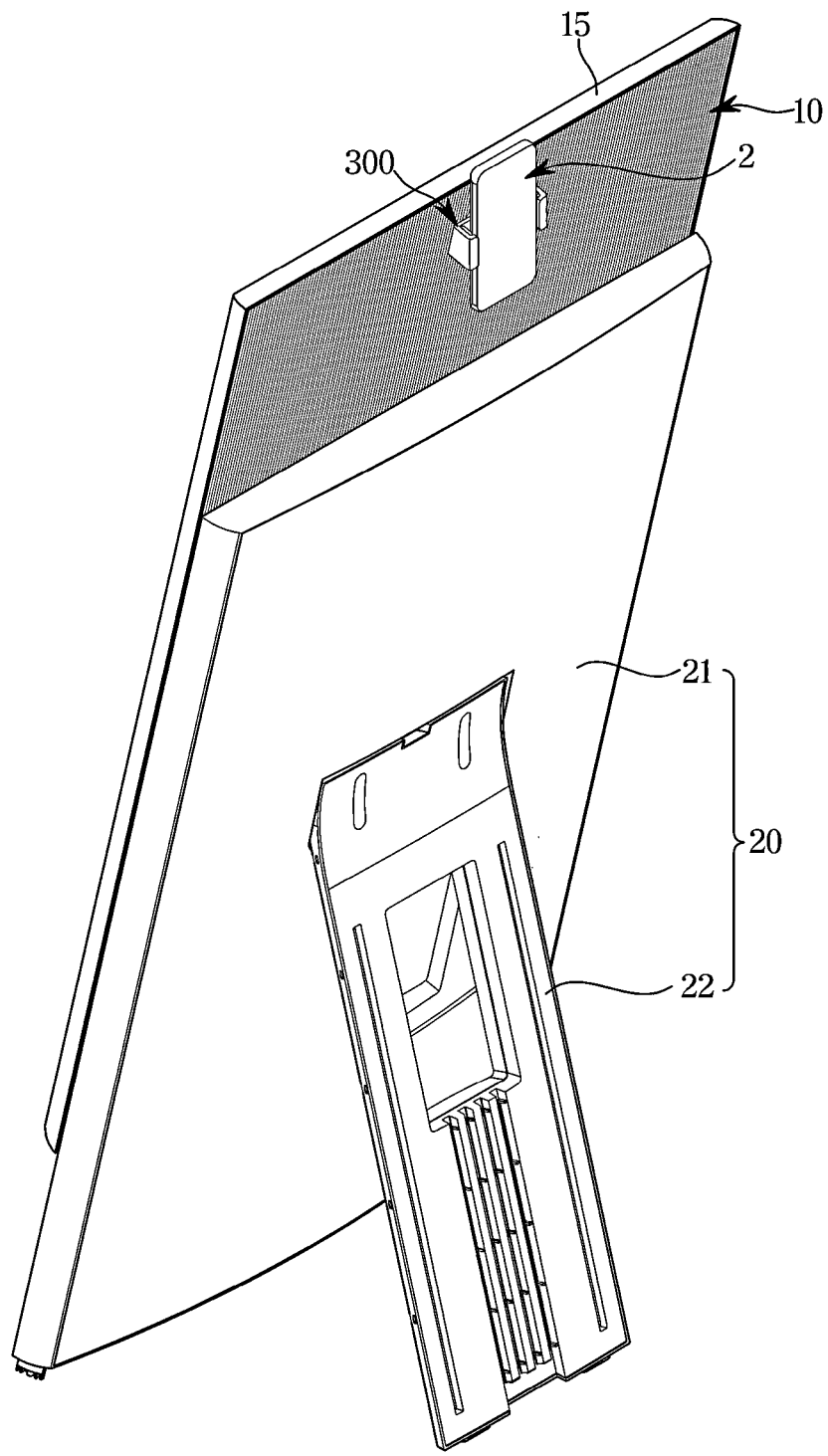
FIG. 12 is a rear perspective view of a display apparatus according to another embodiment of the disclosure.
Figure 13:
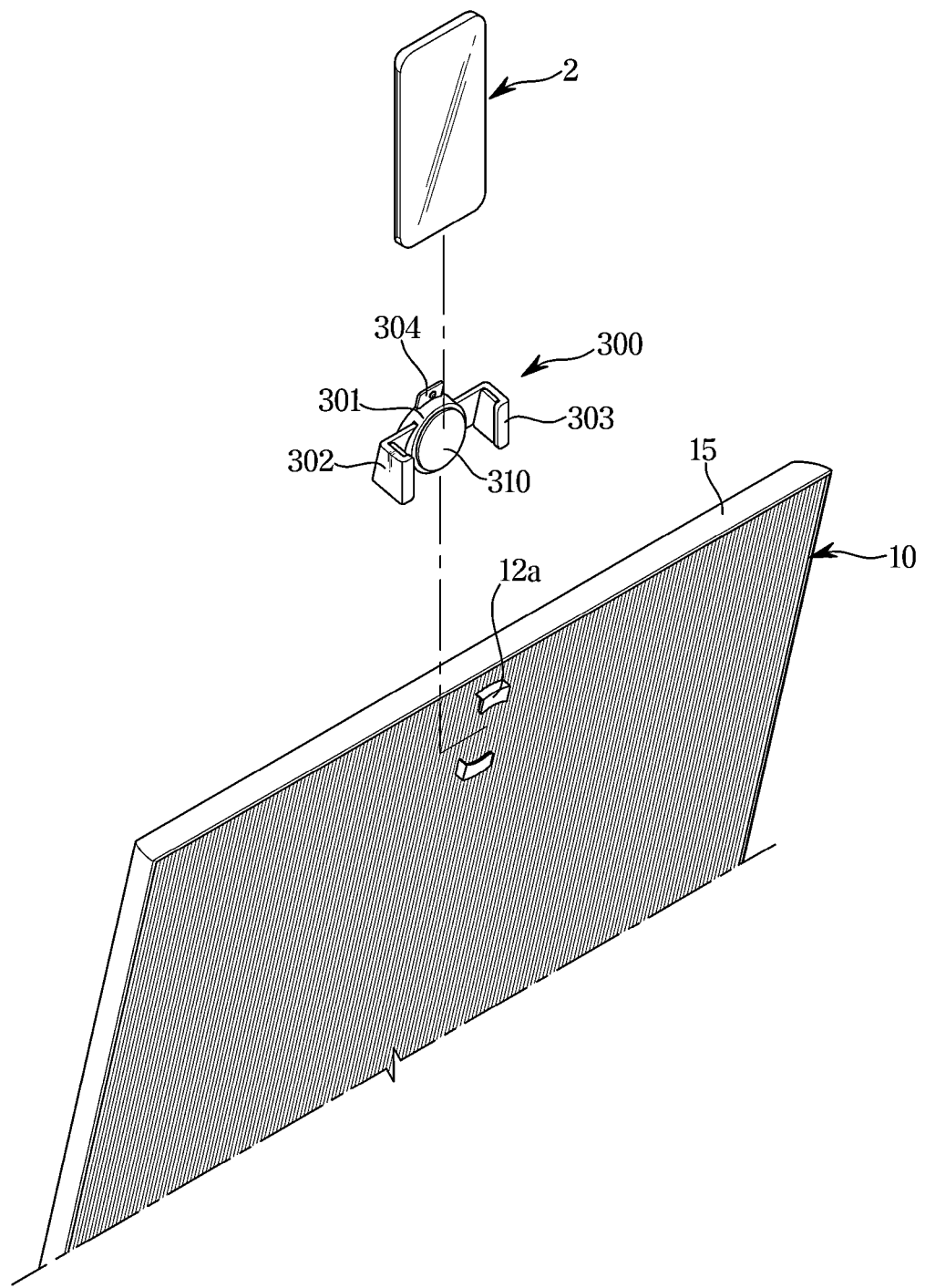
FIG. 13 is an exploded perspective view showing a display module, a mounting device, and a mobile device in the display apparatus shown in FIG. 12.

FIG. 12 is a rear perspective view of a display apparatus according to another embodiment of the disclosure. FIG. 13 is an exploded perspective view showing a display module, a mounting device, and a mobile device in the display apparatus shown in FIG. 12.

Referring to FIGS. 12 and 13, the display apparatus 1 according to another embodiment of the disclosure may include the display module 10, the support device 20, and a mounting device 300.

The display module 10 may include a coupling portion 12a provided on the rear surface. The coupling portion 12a may be in a shape of a box of which at least two portions open. The coupling portion 12a may form an inside space together with the rear surface of the display module 10. A pair of coupling portions 12a may be provided and the mounting device 300 may be positioned between the pair of coupling portions 12a.

The mounting device 300 may include a body 301 being in a shape of a cylinder having a through hole 301a (FIG. 16) penetrating sides of the mounting device 300, a first support portion 302 including an adjusting protrusion 302a positioned inside the through hole 301a, and a second support portion 303 including a plurality of adjusting grooves 303a accommodating the adjusting protrusion 302a inside the through hole 301a.

The body 301 may include a coupling protrusion 304 that is inserted into the inside space of the coupling portion 12a. The coupling protrusion 304 may protrude outward from a side surface of the body 301. A pair of coupling protrusions 304 may be provided.

Hereinafter, one surface of the body 301, which faces the rear surface of the display module 10, will be referred to as a lower surface of the body 301.

The body 301 may further include a non-slip member 310 for preventing the mobile device 2 from slipping. The non-slip member 310 may be provided on an upper surface of the body 301 to correspond to a shape of the upper surface of the body 301. For example, the body 301 may be in a shape of a cylinder, and the non-slip member 310 may be in a shape of a circle corresponding to an upper surface of the cylinder.

The mounting device 300 may include the first support portion 302 and the second support portion 303. The first support portion 302 may include the adjusting protrusion 302a. The second support portion 303 may include the plurality of adjusting grooves 303a accommodating the adjusting protrusion 302a. The first support portion 302 may be coupled to the second support portion 303 inside the through hole 301a formed in the body 301, and when the adjusting protrusion 302a is inserted into one of the adjusting grooves 303a, the first support portion 302 may be coupled to the second support portion 303.

Figure 14:
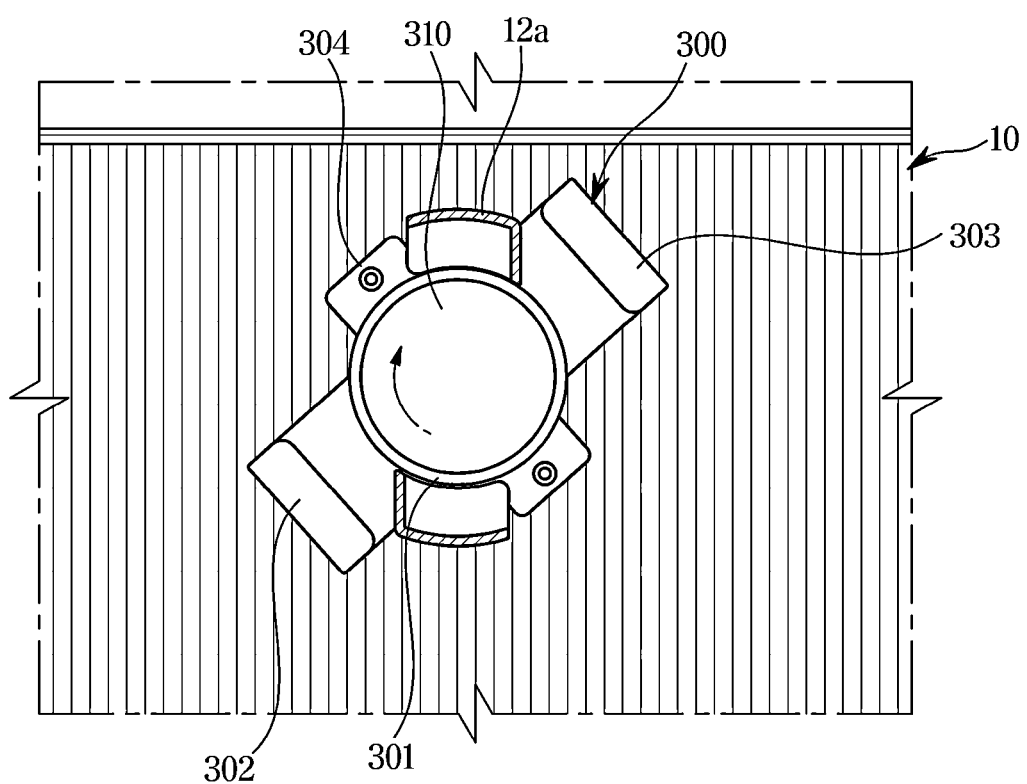
FIG. 14 shows a state before the mounting device is coupled to the display module in the display apparatus shown in FIG. 12.
Figure 15:
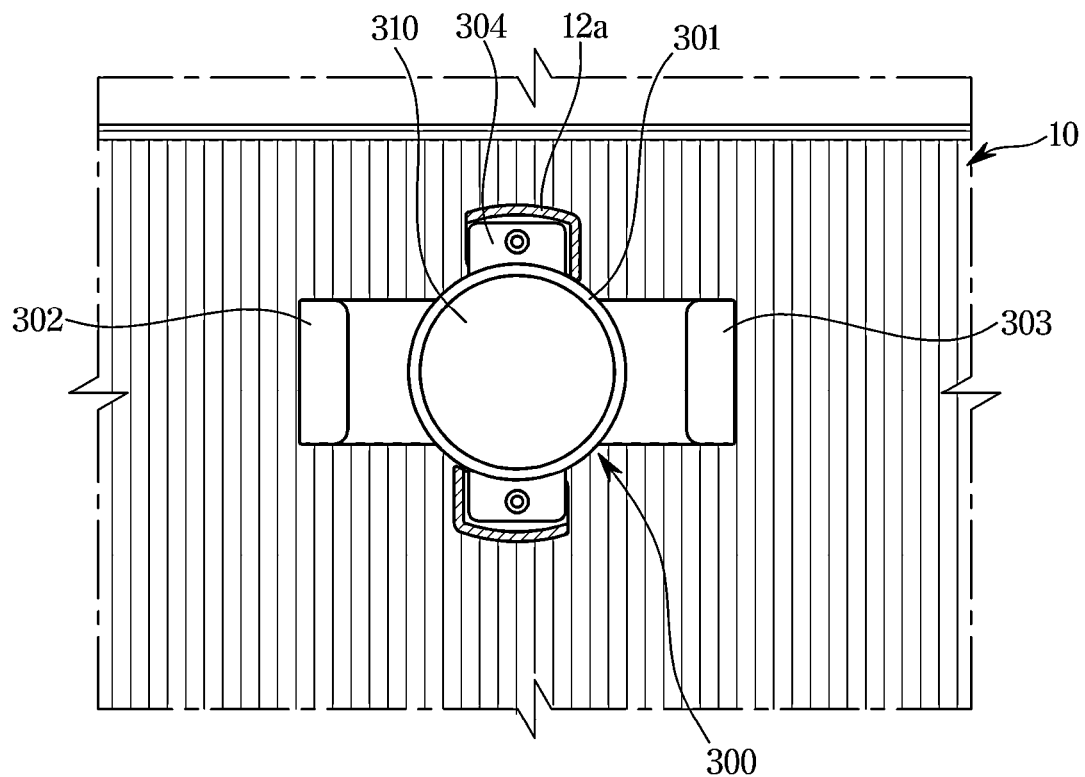
FIG. 15 shows a state after the mounting device is coupled to the display module in the display apparatus shown in FIG. 12.

FIG. 14 shows a state before the mounting device 300 is coupled to the display module 10 in the display apparatus 1 shown in FIG. 12. FIG. 15 shows a state after the mounting device 300 is coupled to the display module 10 in the display apparatus 1 shown in FIG. 12.

Referring to FIGS. 14 and 15, the mounting device 300 may be coupled to the rear surface of the display module 10 and separated from the rear surface of the display module 10, without using any coupling member.

As shown in FIG. 14, the mounting device 300 may be coupled to the display module 10 by positioning the coupling protrusion 304 of the body 301 to a side of the coupling portion 12a and then rotating the body 301 in a clockwise direction in the drawing. While the body 301 rotates, the coupling protrusion 304 may move to the inside space of the coupling portion 12a to be accommodated in the side space. The coupling portion 12a may be in a shape of a box of which at least two parts open. The coupling protrusion 304 may move to the inside space of the coupling portion 12a through the open parts of the coupling portion 12a.

Referring to FIGS. 14 and 15, the coupling portion 12a shown in upper areas of FIGS. 14 and 15 may open at the left and lower parts. The coupling protrusion 304 may rotate in the clockwise direction to move to the inside space of the coupling portion 12a and be accommodated in the inside space of the coupling portion 12a. Because the right part of the coupling portion 12a, as seen in FIGS. 14 and 15, is closed, the coupling portion 12a may be prevented from rotating to a predetermined range or more.

Likewise, the coupling portion 12a shown in lower areas of FIGS. 14 and 15 may open at the right and upper parts. The coupling protrusion 304 may rotate in the clockwise direction to move to the inside space of the coupling portion 12a and be accommodated in the inside space of the coupling portion 12a. Because the left part of the coupling portion 12a, as seen in FIGS. 14 and 15, is closed, the body 301 may no longer rotate in the clockwise direction after the coupling protrusion 304 is accommodated in the inside space of the coupling portion 12a.

When the mounting device 300 is separated from the display module 10, the above-described process may be performed in the reverse order so that the mounting device 300 may be easily separated from the display module 10. When the body 301 rotates in a counterclockwise direction, the coupling protrusion 304 may be taken out of the inside space of the coupling portion 12a, and when the coupling protrusion 304 is taken out, the mounting device 300 may be separated from the display module 10.

Although not shown in the drawings, a structure of the coupling portion may be slightly modified such that the body rotates in the counterclockwise direction to couple the mounting device to the display module. In this case, the body 301 may rotate in the clockwise direction to separate the mounting device 300 from the display module 10.

Figure 16:
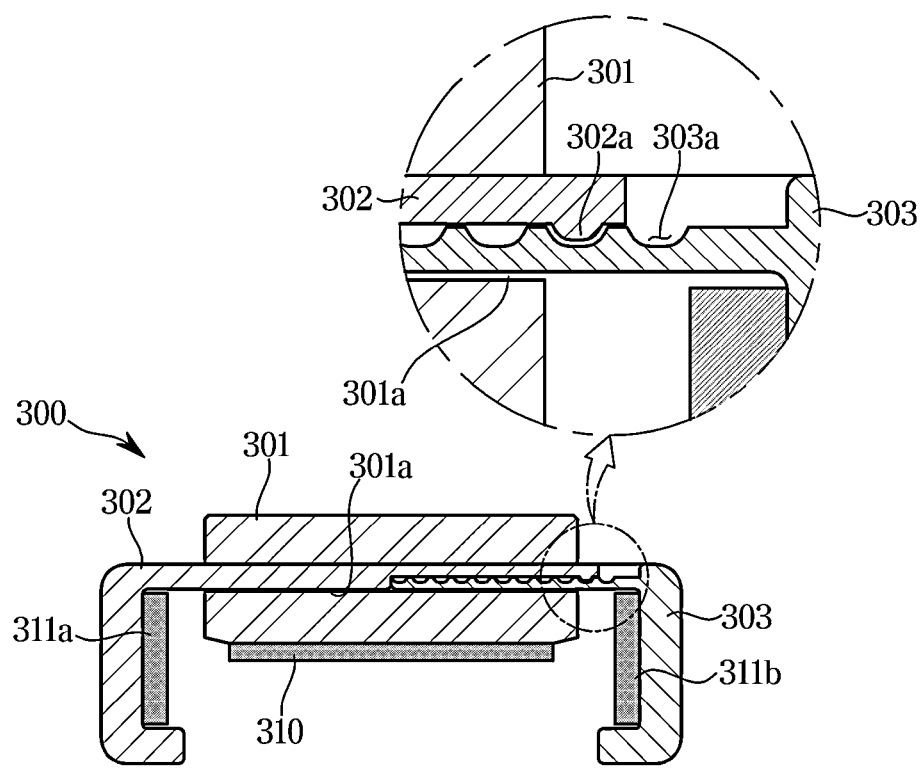
FIG. 16 is a cross-sectional view of the mounting device in the display apparatus shown in FIG. 12.
Figure 17:
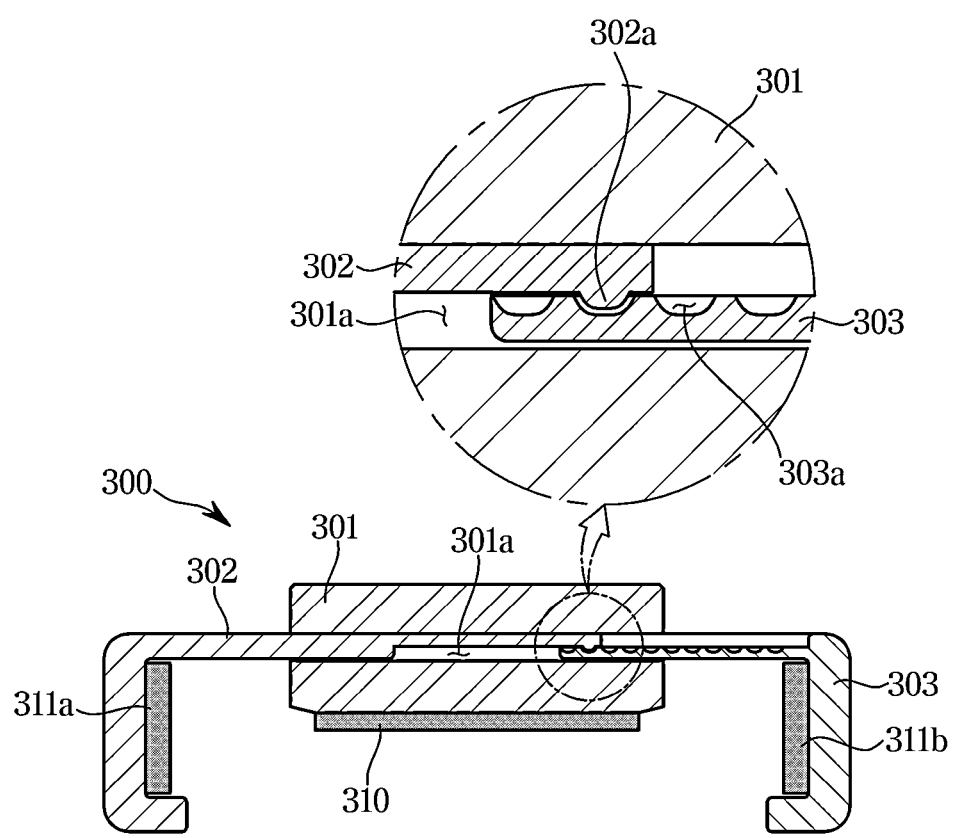
FIG. 17 shows a state in which a distance between a first support portion and a second support portion has increased in the mounting device shown in FIG. 16.

FIG. 16 is a cross-sectional view of the mounting device in the display apparatus shown in FIG. 12. FIG. 17 shows a state in which a distance between the first support portion and the second support portion has increased in the mounting device shown in FIG. 16.

Hereinafter, a method for mounting the mobile device 2 on the mounting device 300 according to another embodiment of the disclosure will be described in detail with reference to FIGS. 16 and 17.

Referring to FIGS. 16 and 17, by positioning the mobile device 2 between the first support portion 302 and the second support portion 303 and then adjusting positions of the first support portion 302 and the second support portion 303, the mounting device 100 may support the mobile device 2.

At one end of the first support portion 302, the adjusting protrusion 302a may be provided, and in the second support portion 303, the plurality of adjusting grooves 303a may be provided along a direction in which the through hole 301a of the body 301 extends.

The adjusting protrusion 302a may be inserted into any one of the plurality of adjusting grooves 303a. When the adjusting protrusion 302a is inserted into any one of the plurality of adjusting grooves 303a, the first support portion 302 may be coupled to the second support portion 303.

Meanwhile, the first support portion 302 and the second support portion 303 may respectively include support surfaces that contact sides of the mobile device 2 and support the mobile device 2. The support surfaces may respectively include non-slip members 311a and 311b. The non-slip members 311a and 311b may be made of the same material as the non-slip member 310 provided on the upper surface of the body 301. The non-slip members 311 provided on the support parts 302b and 303b may improve a frictional force with the sides of the mobile device 2, and the non-slip member 310 provided on the upper surface of the body 301 may improve a frictional force with a front or rear surface of the mobile device 2. By the non-slip members 310 and 311, a frictional force between the mounting device 300 and the mobile device 2 may increase, and accordingly, the mounting device 300 may more stably support the mobile device 2.

When the adjusting protrusion 302a is inserted into an adjusting groove 303a located at one end of the plurality of adjusting grooves 303a, a distance between the first support portion 302 and the second support portion 303 may become smallest. That the distance between the first support portion 302 and the second support portion 303 is smallest means that a distance between the non-slip member 311a positioned on the support part 302b of the first support portion 302 and the non-slip member 311b positioned on the support part 303b of the second support portion 303 is smallest. When the distance between the first support portion 302 and the second portion 303 is smallest, the distance between the first support portion 302 and the second support portion 303 may be smaller than a length of a shorter side of the mobile device 2.

When the adjusting protrusion 302a is inserted into an adjusting groove 303a located at the other end of the plurality of adjusting grooves 303a, a distance between the first support portion 302 and the second support portion 303 may become greatest. When the distance between the first support portion 302 and the second portion 303 is greatest, the distance between the first support portion 302 and the second support portion 303 may be greatest than the length of the shorter side of the mobile device 2.

As described above, the user may freely adjust a distance between the first support portion 302 and the second support portion 303. The user may position the mobile device 2 between the first support portion 302 and the second support portion 303, and then adjust a distance between the first support portion 302 and the second support portion 303 to the length of the shorter side of the mobile device 2, thereby mounting the mobile device 2 on the mounting device 300.

Figure 18:
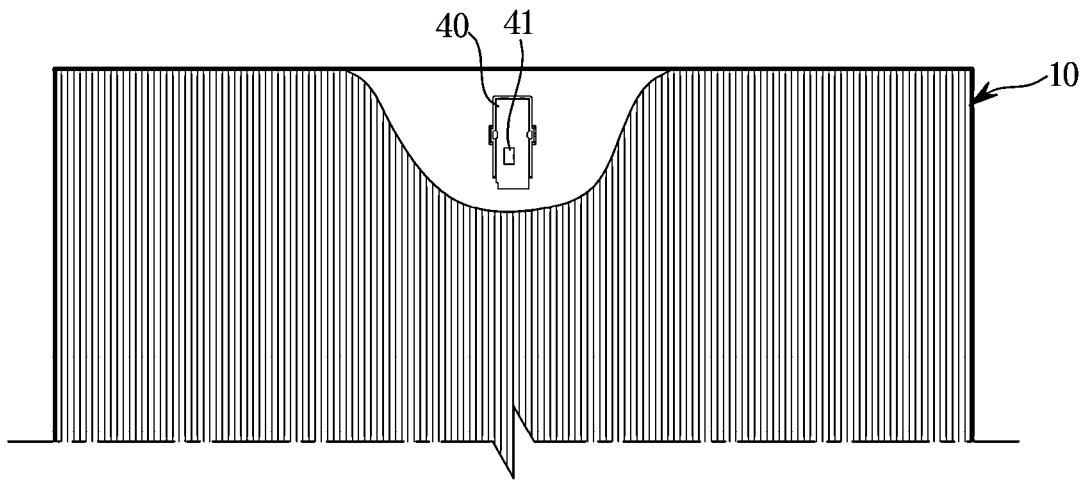
FIG. 18 shows a portion of a rear surface of a display module in a display apparatus according to an embodiment of the disclosure.

FIG. 18 shows a portion of a rear surface of a display module in a display apparatus according to an embodiment of the disclosure.

Referring to FIG. 18, the display apparatus 1 according to an embodiment of the disclosure may include a printed circuit board 40 which is positioned inside the display module 10 and on which a near field communication (NFC) chip 41 is mounted.

According to an embodiment of the disclosure, the printed circuit board 40 on which the NFC chip 41 is mounted may be located at a position corresponding to the mounting device 100, 200, or 300. Due to the position of the printed circuit board 40, the NFC chip 41 may be located close to the mobile device 2 that is mounted on the mounting device 100, 200, or 300.

According to the position of the printed circuit board 40 and the NFC chip 41, when the mobile device 2 is mounted on the mounting device 100, 200, or 300, a NFC chip (not shown) installed inside the mobile device 2 may be tagged with the NFC chip 41 provided inside the display module 10. The mobile device 2 may be set to be paired with the display module 10 when being NFC-tagged with the display module 10. According to the setting of the mobile device 2, when a user mounts the mobile device 2 on the mounting device 100, 200, or 300 mounted on the display module 10, the mobile device 2 may be automatically paired with the display module 10. Because the user is capable of pairing the mobile device 2 with the display module 10 by mounting the mobile device 2 on the mounting device 100, 200, or 300, a user convenience may be improved.

Meanwhile, the mobile device 2 may be paired with the display module 10 by various methods. For example, the mobile device 2 may be connected to the display module 10 through NFC, Bluetooth, or Wireless-Fidelity (Wi-Fi). Also, the display module 10 may have a $5^{th}$ Generation (5G) network function. In this case, the display module 10 may be paired with the mobile device 2 having a 5G network function through a 5G network.

According to a technical concept of the disclosure, there is provided a display apparatus including a display module, a support device for rotatably supporting the display module, and a mounting device for mounting a mobile device on the display module.

According to another technical concept of the disclosure, there is provided a display apparatus capable of using a camera module of a mobile device to use a camera without including any camera module in the display apparatus.

According to another technical concept of the disclosure, there is provided a display apparatus capable of pairing a mobile device with a display module when the mobile device is mounted on a mounting device.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a display module including a frame; and
a mounting device including:
   a mounting portion configured to receive the frame to couple the mounting device to the display module, and
   an accommodating portion including:
      a first support part,
      a second support part extended from the first support part, and
      a third support part hinge-coupled to the second support part so as to be rotatable with respect to the second support part,
   wherein, when the frame is received by the mounting portion and the mounting device is coupled to the display module,
      the first support part is configured to support one of a front portion and a rear portion of a mobile device,
      the second support part is configured to support a lower portion of the mobile device, and,
      when the one of the front portion and the rear portion of the mobile device is supported by the first support part and the lower portion of the mobile device is supported by the second support part, the third support part is rotatable with respect to the second support part to a position at which the third support part supports the other of the front portion and the rear portion of the mobile device, to thereby mount the mobile device in the mounting device.

2. The display apparatus according to claim 1, wherein the mounting portion is configured to receive the frame to removably couple the mounting device to the display module.

3. The display apparatus according to claim 1, further comprising:
a support device configured to rotatably support the display module so that the display module is rotatable to be positioned in a vertical mode and to be positioned in a horizontal mode, wherein
when the frame is received by the mounting portion and the mounting device is coupled to the display module,
   the mounting device is on a top end of the display module when the display module is positioned in the vertical mode, and
   when the display module is rotated from being positioned in the vertical mode to be positioned in the horizontal mode, the mounting device is rotated together with the display module so as to be positioned at a left or a right side of the display module.

4. The display apparatus according to claim 1, wherein the mounting device includes a non-slip member on the first support part or the second support part and configured to, when the mobile device is mounted in the mounting device, prevent the mobile device from slipping.

5. The display apparatus according to claim 4, wherein the non-slip member includes a rubber material.

6. The display apparatus according to claim 1, wherein the second support part is nearly perpendicular to the first support part.

7. The display apparatus according to claim 1, wherein the mounting portion is configured to receive an upper side of the frame so that, when the frame is received by the mounting portion, the mounting device is mounted on the upper side of the frame.

8. The display apparatus according to claim 1, wherein the first support part is below the mounting portion when the mounting device is coupled to the display module.

9. The display apparatus according to claim 1, wherein the mounting device is configured so that, when the mobile device is mounted in the mounting device, the mobile device is held in position by an elastic restoring force acting in a direction in which the third support part approaches the first support part.

10. The display apparatus according to claim 1, wherein the first support part is configured to support the front portion of the mobile device.

11. The display apparatus according to claim 1, wherein the second support part protrudes from a lower portion of the first support part.

12. The display apparatus according to claim 11, wherein the third support part is configured to support the rear portion of the mobile device.

13. The display apparatus according to claim 1, wherein the frame incudes:
a front portion, wherein one end of the front portion contacts a screen display area of the display module,
a side portion connected to an other end of the front portion, inclined backward from the screen display area, and being larger than the front portion, and
a rear portion extending from the side portion toward a rear surface of the display module.

14. The display apparatus according to claim 13, wherein the mounting portion includes:
a first contact part configured to, when the frame is received by the mounting portion, contact the front portion of the frame,
a second contact part configured to, when the frame is received by the mounting portion, contact the side portion of the frame, and
a third contact part configured to, when the frame is received by the mounting portion, contact the rear portion of the frame.

15. A mounting device comprising:
a mounting portion configured to receive a frame of a display module to couple the mounting device to the display module; and
an accommodation portion including:
   a first support part,
   a second support part extended from the first support part and nearly perpendicular to the first support part, and
   a third support part hinge-coupled to the second support part so as to be rotatable with respect to the second support part,
wherein, when the frame is received by the mounting portion and the mounting device is coupled to the display module,
   the first support part is configured to support one of a front portion and a rear portion of a mobile device,
   the second support part is configured to support a lower portion of the mobile device, and
   when the one of the front portion and the rear portion of the mobile device is supported by the first support part and the lower portion of the mobile device is supported by the second support part, the third support part is rotatable with respect to the second support part to a position at which the third support part supports the other of the front portion and the rear portion of the mobile device, to thereby mount the mobile device in the mounting device.

16. The mounting device according to claim 15, further including:
- a non-slip member on the first support part or the second support part, and configured to, when the mobile device is mounted in the mounting device, prevent the mobile device from slipping.

17. The mounting device according to claim 16, wherein the non-slip member includes a rubber material.

18. The mounting device according to claim 15, wherein the mounting portion includes:
- a first contact part configured to, when the frame is received by the mounting portion, contact a front portion of the frame, wherein the front portion of the frame contacts a screen display area of the display module,
- a second contact part configured to, when the frame is received by the mounting portion, contact a side portion of the frame, and
- a third contact part configured to, when the frame is received by the mounting portion, contact a rear portion of the frame.

* * * * *